US012732922B2

(12) United States Patent
Bae

(10) Patent No.: US 12,732,922 B2
(45) Date of Patent: Sep. 8, 2026

(54) ELECTRONIC DEVICE TRANSMITTING UPLINK SIGNAL AND OPERATING METHOD THEREOF

(71) Applicant: Samsung Electronics Co., Ltd., Suwon-si (KR)

(72) Inventor: Janggun Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 18/348,796

(22) Filed: Jul. 7, 2023

(65) Prior Publication Data

US 2023/0354217 A1 Nov. 2, 2023

Related U.S. Application Data

(63) Continuation of application No. PCT/KR2021/019513, filed on Dec. 21, 2021.

(30) Foreign Application Priority Data

Jan. 7, 2021 (KR) ........................ 10-2021-0002225

(51) Int. Cl.
*H04W 52/36* (2009.01)
*H04W 74/0833* (2024.01)

(52) U.S. Cl.
CPC ...... *H04W 52/367* (2013.01); *H04W 74/0833* (2013.01)

(58) Field of Classification Search
None
See application file for complete search history.

(56) References Cited

U.S. PATENT DOCUMENTS 11,228,985 B2 * 1/2022 Cha ........................ H04W 52/34
11,388,683 B2 * 7/2022 Ohara ................... H04W 52/36
(Continued)

FOREIGN PATENT DOCUMENTS

CN 113993209 A * 1/2022 .......... H04W 72/543
KR 10-2005-0007563 A 1/2005
(Continued)

OTHER PUBLICATIONS

International Search Report dated Mar. 25, 2022, issued in International Patent Application No. PCT/KR2021/019513.
(Continued)

*Primary Examiner* — Joseph E Avellino
(74) *Attorney, Agent, or Firm* — Jefferson IP Law, LLP

(57) ABSTRACT

An electronic device is provided. The electronic device includes a processor and an RF device, the processor configured to identify transmission powers respectively corresponding to a plurality of messages, identify the maximum output power of the electronic device on the basis of its state, control the RF device to, when at least one first transmission power corresponding to at least one first message of the plurality of messages is less than the maximum output power, provide a first RF signal having the maximum output power for transmission of the at least one first message, and control the RF device to, when at least one second transmission power corresponding to at least one second message of the plurality of messages is less than the maximum output power, provide a second RF signal having a power greater than the maximum output power for transmission of the at least one second message.

18 Claims, 22 Drawing Sheets

(56) References Cited

U.S. PATENT DOCUMENTS

| | | | |
|---|---|---|---|
| 11,716,766 | B2 * | 8/2023 | Taherzadeh Boroujeni ................ H04W 48/02 370/328 |
| 12,069,584 | B2 * | 8/2024 | Kiilerich Pratas .. H04W 52/246 |
| 12,250,640 | B2 * | 3/2025 | Qi ....................... H04W 52/283 |
| 12,317,327 | B2 * | 5/2025 | MolavianJazi ...... H04B 7/0695 |
| 12,557,039 | B2 * | 2/2026 | Yuan .................. H04W 52/367 |
| 2003/0228875 | A1 | 12/2003 | Alapuranen |
| 2011/0319123 | A1 | 12/2011 | Kwun et al. |
| 2012/0001574 | A1 * | 1/2012 | Akaishi ................ H02P 29/032 318/400.04 |
| 2012/0147801 | A1 | 6/2012 | Ho et al. |
| 2012/0231784 | A1 | 9/2012 | Kazmi |
| 2012/0270519 | A1 | 10/2012 | Ngai et al. |
| 2012/0270592 | A1 | 10/2012 | Ngai et al. |
| 2014/0274188 | A1 | 9/2014 | Thorson et al. |
| 2015/0271768 | A1 | 9/2015 | Jang et al. |
| 2016/0029425 | A1 * | 1/2016 | Jang ..................... H04W 52/50 370/336 |
| 2016/0205525 | A1 | 7/2016 | Baghel et al. |
| 2017/0223694 | A1 | 8/2017 | Han et al. |
| 2018/0199348 | A1 | 7/2018 | Kumar et al. |
| 2018/0249429 | A1 | 8/2018 | Zhang et al. |
| 2019/0075503 | A1 | 3/2019 | Bae et al. |
| 2019/0104482 | A1 | 4/2019 | Wilhelmsson et al. |
| 2019/0215783 | A1 | 7/2019 | Chakraborty |
| 2020/0163023 | A1 * | 5/2020 | Pelletier ................ H04W 52/38 |
| 2022/0132438 | A1 * | 4/2022 | Cha ..................... H04W 52/246 |
| 2022/0191940 | A1 * | 6/2022 | MolavianJazi ... H04W 74/0833 |
| 2023/0345387 | A1 * | 10/2023 | Chen .................... H04W 52/32 |

FOREIGN PATENT DOCUMENTS

| | | | | | |
|---|---|---|---|---|---|
| KR | 10-2012-0001574 | A | | 1/2012 | |
| KR | 20120001574 | A | * | 1/2012 | .......... H04W 52/228 |
| KR | 10-2013-0112041 | A | | 10/2013 | |
| KR | 10-2015-0109925 | A | | 10/2015 | |
| KR | 10-2016-0108468 | A | | 9/2016 | |
| KR | 10-2019-0027426 | A | | 3/2019 | |
| WO | WO-2022022396 | A1 | * | 2/2022 | .......... H04W 72/543 |
| WO | WO-2022060006 | A1 | * | 3/2022 | ........... H04L 5/0051 |

OTHER PUBLICATIONS

Korean Office Action dated Apr. 29, 2026, issued in Korean Application No. 10-2021-0002225.

3rd Generation Partnership Project, Technical Specification Group Radio Access Network; NR; Physical layer procedures for control (Release 16), TS 38.213 v16.2.0, Jul. 20, 2020.

* cited by examiner

ELECTRONIC DEVICE TRANSMITTING UPLINK SIGNAL AND OPERATING METHOD THEREOF

CROSS-REFERENCE TO RELATED APPLICATION(S)

This application is a continuation application, claiming priority under § 365(c), of an International application No. PCT/KR2021/019513, filed on Dec. 21, 2021, which is based on and claims the benefit of a Korean patent application number 10-2021-0002225, filed on Jan. 7, 2021, in the Korean Intellectual Property Office, the disclosure of which is incorporated by reference herein in its entirety.

BACKGROUND

1. Field

The disclosure relates to an electronic device transmitting an uplink signal and a method for operating the same.

2. Description of Related Art

A user equipment (UE) may emit electromagnetic waves to transmit an uplink signal to a network. Electromagnetic waves radiated from the UE may harm the human body, and various domestic or foreign organizations attempt to restrict the harmful electromagnetic waves. For example, the specific absorption rate (SAR) is a value indicating how much electromagnetic radiation from a mobile communication terminal is absorbed by the human body. SAR uses the unit of KW/g (or mW/g), which may mean the magnitude of power (KW, W or mW) absorbed per 1 g of the human body. As the issue of harmfulness of electromagnetic waves attracts attention, SAR restriction rules for mobile communication terminals have been established.

The UE may determine transmission power for transmission of an uplink signal. For example, if an expected SAR is expected to exceed a threshold based on the determined transmission power, a signal having a transmission power level smaller than the determined transmission power is transmitted, and this may be expressed as transmission power being limited. For example, when a grip event, hot-spot event, and proxy event, which are events associated with SAR restrictions, are identified, the signal of the transmission power corresponding to the event is transmitted. Therefore, transmission power may be limited.

Transmission power may be limited for various reasons, as well as the SAR restriction rules. For example, when the UE is positioned in a weak electric field or when a pathloss between the UE and the network is relatively large, the determined transmission power of the uplink signal exceeds the maximum output power of the UE. Even in this case, the determined transmission power may be limited.

The above information is presented as background information only to assist with an understanding of the disclosure. No determination has been made, and no assertion is made, as to whether any of the above might be applicable as prior art with regard to the disclosure.

SUMMARY

As described above, transmission power of an uplink signal may be limited for various reasons including SAR restriction rules. As transmission power is limited when performing a random access channel (RACH) procedure, an RACH failure may occur. Accordingly, handover requiring a RACH procedure may fail or radio link failure (RLF) may occur. Alternatively, when transmission power is limited during a measurement report for handover, handover may not proceed because the network does not receive the measurement report. Or, if transmission power is limited while an Internet protocol (IP)-based voice call (e.g., voice over long-term evolution (LTE) (VoLTE), or voice over new radio (NR) (VoNR)) is performed, the uplink block error rate (BLER) deteriorates, causing a mute or a call drop.

Aspects of the disclosure are to address at least the above-mentioned problems and/or disadvantages and to provide at least the advantages described below. Accordingly, an aspect of the disclosure is to provide an electronic device and an operation method thereof transmitting a designated uplink signal with transmission power larger than the limited transmission power even when transmission power is limited.

Another aspect of the disclosure is to provide an electronic device and an operation method thereof adjusting the bitrate of a codec when transmission power is limited while using an IP-based voice call service.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor and at least one radio frequency (RF) device. The at least one processor may be configured to identify a plurality of transmission power respectively corresponding to a plurality of messages, identify a maximum output power of the electronic device based on a state of the electronic device, in case that at least one first transmission power corresponding to at least one first message among the plurality of messages is smaller than the maximum output power, control the at least one RF device to provide a first RF signal having the maximum output power, to transmit the at least one first message, and in case that at least one second transmission power corresponding to at least one second message among the plurality of messages is smaller than the maximum output power, control the at least one RF device to provide a second RF signal having a power larger than the maximum output power, to transmit the at least one second message.

In accordance with another aspect of the disclosure, an electronic device is provided. The electronic device includes at least one processor and at least one RF device. The at least one processor may be configured to identify a first transmission power for transmitting a first real-time transport protocol (RTP) packet, identify a first maximum output power of the electronic device based on a state of the electronic device, control the at least one RF device to provide a first RF signal having the first transmission power, to transmit the first RTP packet obtained based on a first bitrate based on the identified first transmission power and the first maximum output power of the electronic device failing to meet a designated condition, identify a second transmission power for transmitting a second RTP packet, identify a second maximum output power of the electronic device based on the state of the electronic device, and control the at least one RF device to provide a second RF signal having the maximum output power, to transmit the second RTP packet obtained based on a second bitrate lower than the first bitrate based on the identified second transmission power and the second maximum output power of the electronic device meeting the designated condition.

In accordance with another aspect of the disclosure, a method for operating an electronic device is provided. The method includes at least one RF device may comprise identifying a plurality of transmission power respectively corresponding to a plurality of messages, identifying a maximum output power of the electronic device based on a state of the electronic device, in case that at least one first transmission power corresponding to at least one first message among the plurality of messages is smaller than the maximum output power, controlling the at least one RF device to provide a first RF signal having the maximum output power, to transmit the at least one first message, and in case that at least one second transmission power corresponding to at least one second message among the plurality of messages is smaller than the maximum output power, controlling the at least one RF device to provide a second RF signal having a power larger than the maximum output power, to transmit the at least one second message.

According to various embodiments, there may be provided an electronic device and an operation method thereof, which may transmit a designated uplink signal with transmission power larger than limited transmission power. Accordingly, handover failure or RLF occurrence due to sufficient transmission power of the uplink signal may be prevented. According to various embodiments, the electronic device and the operation method thereof may reduce the bitrate of a codec when transmission power is limited while using an IP-based voice call service. As the bitrate of the codec decreases, occurrence of mute or call drop due to transmission power restriction may be prevented.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to "a component surface" includes reference to one or more of such surfaces.

Figure 1:
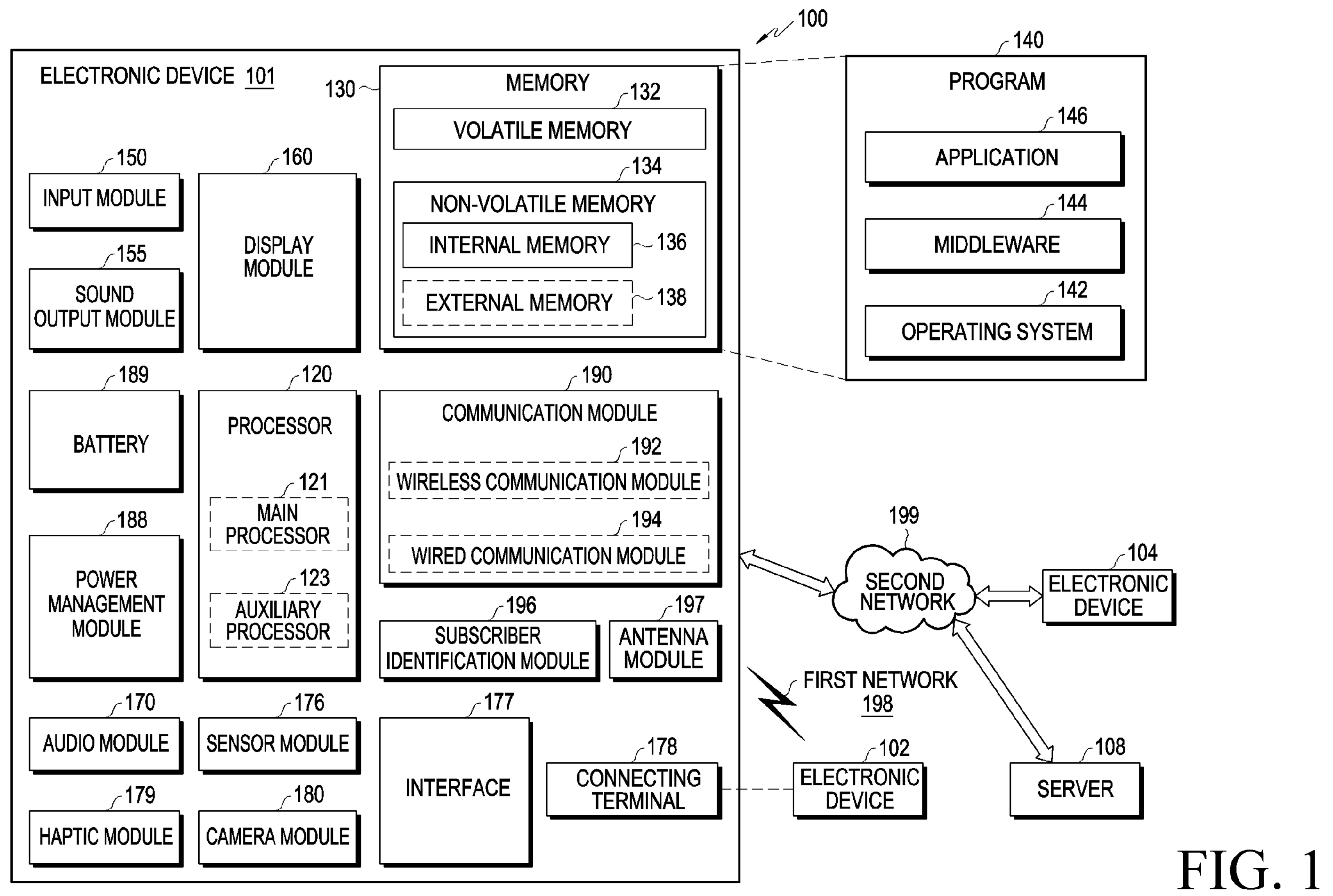
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a communication module 192 (e.g., a cellular communication module, a short-range communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The communication module 192 may identify or authenticate the electronic device 101 in a communication network, such as the first network 198 or the second network 199, using subscriber information (e.g., international mobile subscriber identity (IMSI)) stored in the subscriber identification module 196.

The communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The communication module 192 may support a high-frequency band (e.g., the mmWave band) to achieve, e.g., a high data transmission rate. The communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The communication module 192 may support various requirements specified in the electronic device 101, an external electronic device (e.g., the electronic device 104), or a network system (e.g., the second network 199). According to an embodiment, the communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
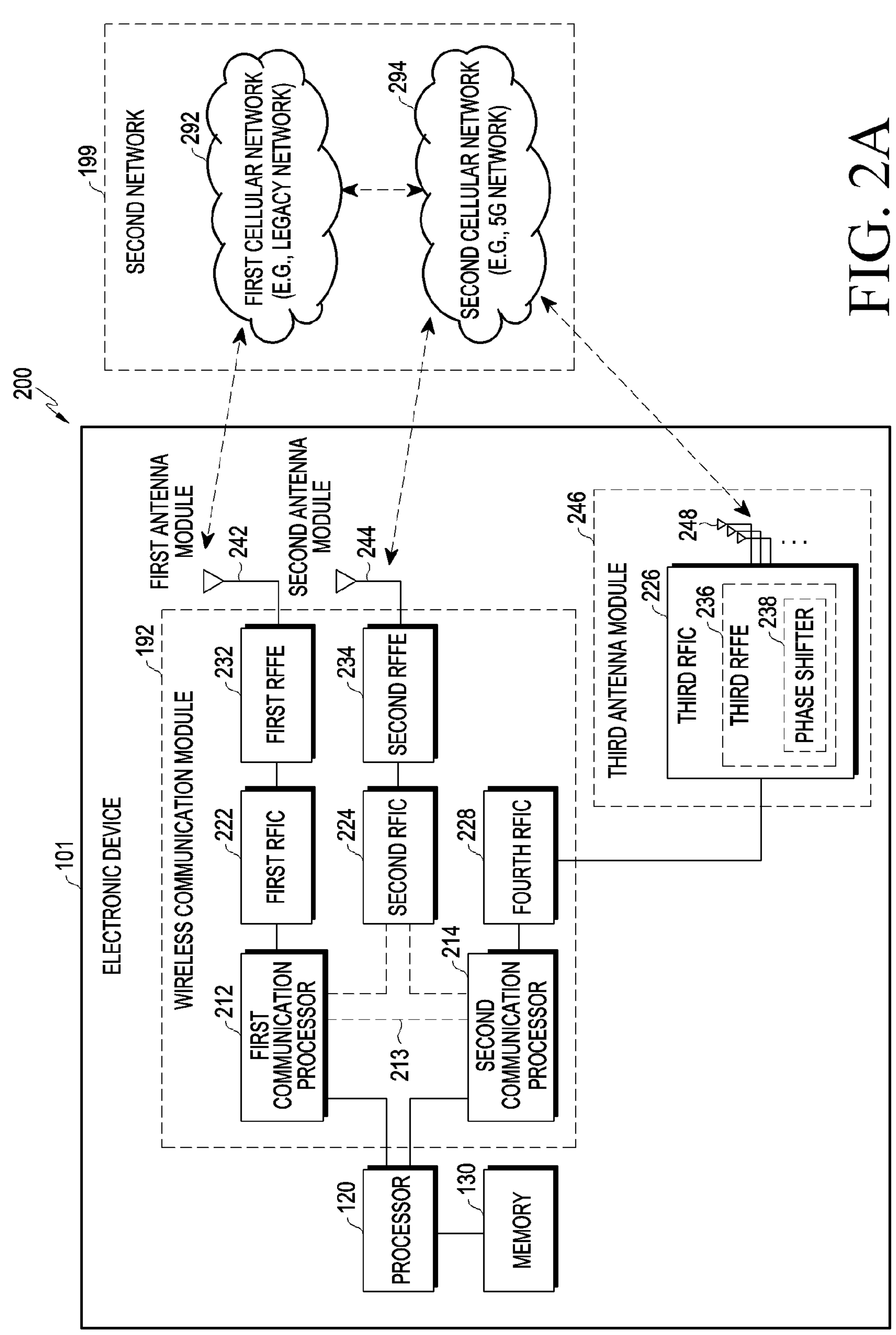
FIGS. 2A and 2B are block diagrams illustrating an electronic device for supporting legacy network communication and fifth-generation (5G) network communication according to various embodiments of the disclosure.
Figure 2B:
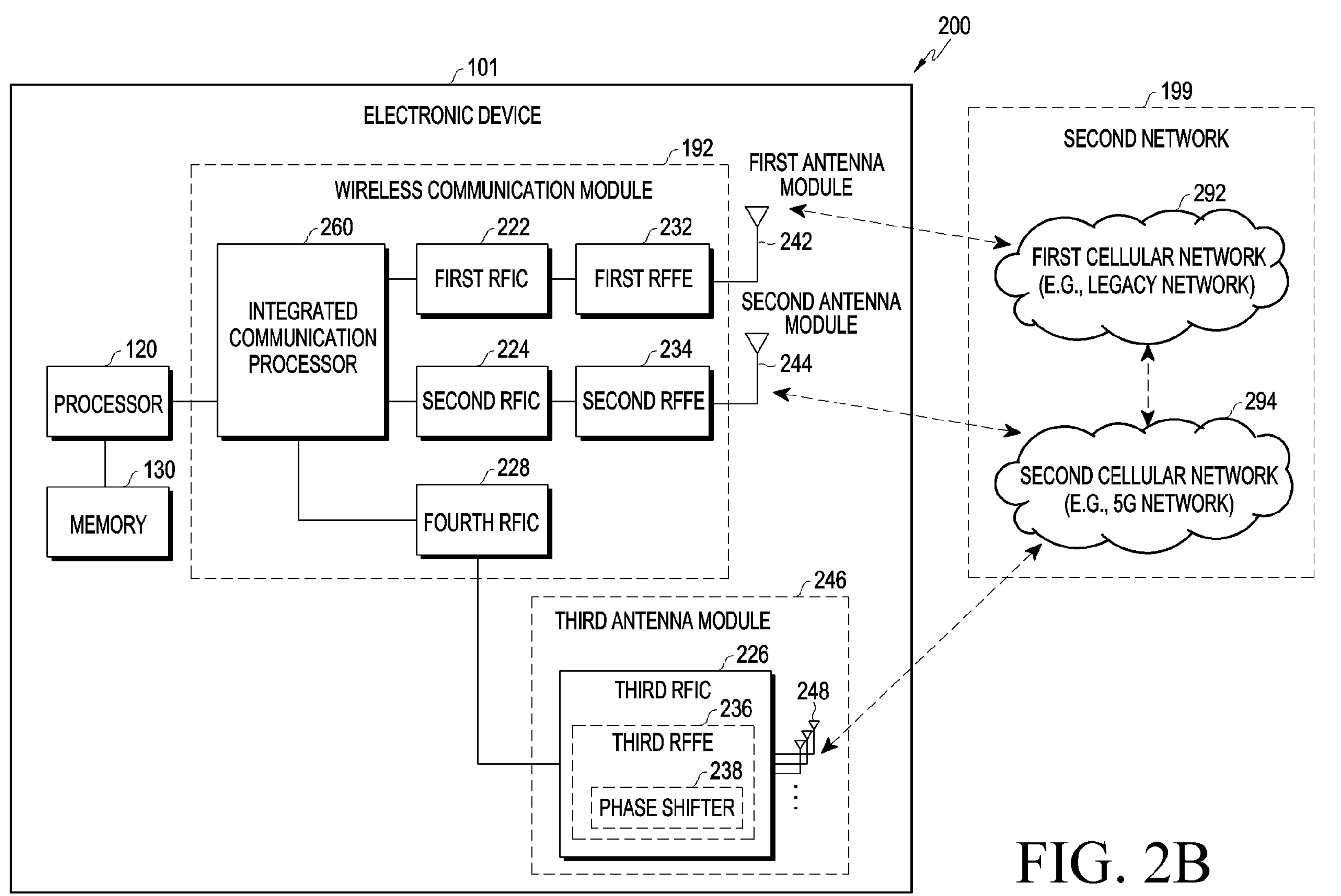

FIGS. 2A and 2B are block diagrams illustrating an electronic device for supporting legacy network communication and 5G network communication according to various embodiments of the disclosure.

Referring to FIG. 2A, in block diagrams 200, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second communication processor 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to another embodiment, the second cellular network 294 may be a 5G network defined by the 3rd generation partnership project (3GPP). Additionally, according to yet another embodiment, the first communication processor 212 or the second communication processor 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 is changed to be transmitted via the first cellular network 292. In this case, the first communication processor 212 may receive transmission data from the second communication processor 214. For example, the first communication processor 212 transmits/receives data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various types of information, such as sensing information, information about output strength, and resource block (RB) allocation information, to/from the second communication processor 214.

According to an implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to yet another embodiment, the first communication processor 212 and the second communication processor 214 may be implemented in a single chip or a single package. According to yet another embodiment, the first communication processor 212 or the second communication processor 214, along with the processor 120, an auxiliary processor 123, or communication module 190, may be formed in a single chip or single package. For example, referring to FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to yet another embodiment, the third RFFE 236 may be formed as part of the third RFIC 226.

According to yet another embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to yet another embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to yet another embodiment, the first RFFE 232 and the second RFFE 234 may be implemented as at least part of a single chip or single package. According to yet another embodiment, at least one of the first antenna module 242 or the second antenna module 244 may be omitted or be combined with another antenna module to process multi-band RF signals.

According to yet another embodiment, the third RFIC 226 and the antenna 248 may be disposed on the same substrate to form the third antenna module 246. For example, the communication module 192 or the processor 120 is disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to yet another embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may have the access network (e.g., 5G radio access network (RAN) or next generation RAN (NG RAN)) does not have the core network (e.g., next generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first communication processor 212, or the second communication processor 214).

Figure 3A:
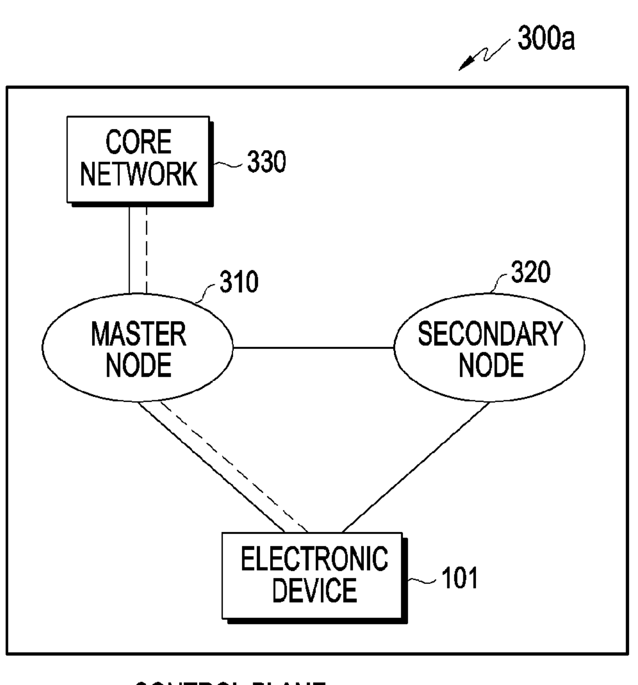
FIGS. 3A, 3B, and 3C are views illustrating wireless communication systems providing legacy communication and/or 5G communication networks according to various embodiments of the disclosure.
Figure 3B:
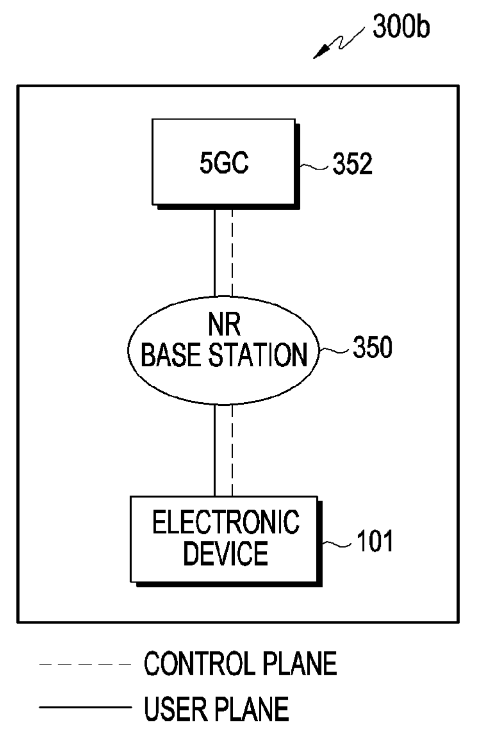
Figure 3C:
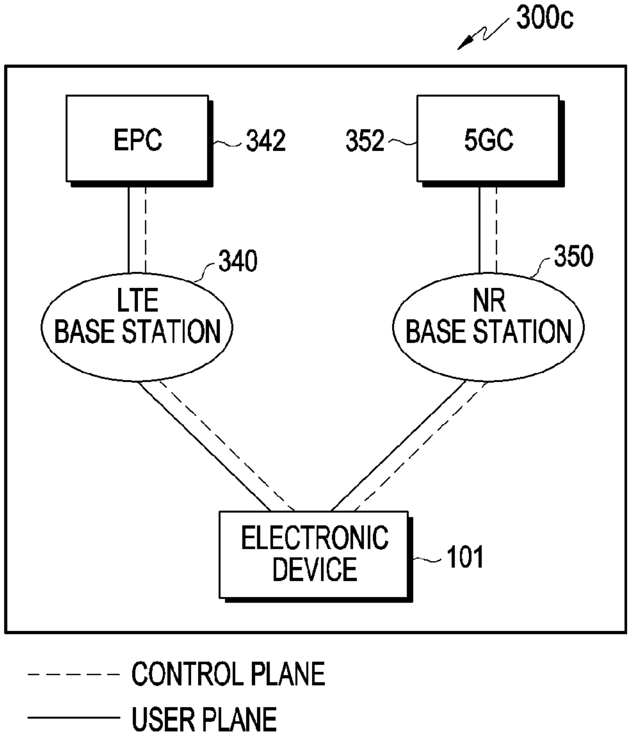

FIGS. 3A, 3B, and 3C are views illustrating wireless communication systems providing legacy communication and/or 5G communication networks according to various embodiments of the disclosure.

Referring to FIGS. 3A, 3B, and 3C, the network environment 300*a*, 300*b* and 300*c* may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., a new radio (NR) base station 350 (e.g., a gNodeB (gNB)) that supports radio access with the electronic device 101 and a 5th generation core (5GC) 352 that manages 5G communication for the electronic device 101.

According to various embodiments, the electronic device 101 may transmit or receive control messages and user data via legacy communication and/or 5G communication. The control messages may include messages related to at least one of, e.g., security control, bearer setup, authentication, enrollment, or mobility management of the electronic device 101. The user data may mean, e.g., user data except for control messages transmitted or received between the electronic device 101 and the core network 330 (e.g., the EPC 342).

Referring to FIG. 3A, according to yet another embodiment, the electronic device 101 may transmit or receive at least one of a control message or user data to/from at least part (e.g., the NR base station 350 or 5GC 352) of the 5G network via at least part (e.g., the LTE base station 340 or EPC 342) of the legacy network.

According to various embodiments, the network environment 300*a* may include a network environment that provides wireless communication dual connectivity (DC) to the LTE base station 340 and the NR base station 350 and transmits or receives control messages to/from the electronic device 101 via one core network 330 of the EPC 342 or the 5GC 352.

According various embodiments, in the DC environment, one of the LTE base station 340 or the NR base station 350 may operate as a master node (MN) 310, and the other as a secondary node (SN) 320. The MN 310 may be connected to the core network 330 to transmit and receive control messages. The MN 310 and the SN 320 may be connected with each other via a network interface to transmit or receive messages related to radio resource (e.g., communication channel) management therebetween.

According to various embodiments, the MN 310 may include the LTE base station 340, the SN may include the NR base station 350, and the core network 330 may include the EPC 342. For example, control messages are transmitted/received via the LTE base station 340 and the EPC 342, and user data may be transmitted/received via at least one of the LTE base station 340 or the NR base station 350.

According to various embodiments, the MN 310 may include the NR base station 350, the SN 320 may include the LTE base station 340, and the core network 330 may include the 5GC 352. For example, control messages are transmitted/received via the NR base station 350 and the 5GC 352, and user data may be transmitted/received via at least one of the LTE base station 340 or the NR base station 350.

Referring to FIG. 3B, according to various embodiments, the 5G network may include the NR base station 350 and the 5GC 352 and transmit/receive control messages and user data independently from the electronic device 101.

Referring to FIG. 3C, according to an embodiment, the legacy network and the 5G network each may provide data transmission/reception independently. For example, the electronic device 101 and the EPC 342 transmit/receive control messages and user data through the LTE base station 340. As another example, the electronic device 101 and the 5GC 352 transmit/receive control messages and user data through the NR base station 350.

According to various embodiments, the electronic device 101 may be registered in at least one of the EPC 342 or the 5GC 352 to transmit or receive control messages.

According to various embodiments, the EPC 342 or the 5GC 352 may interwork with each other to manage communication for the electronic device 101. For example, mobility information for the electronic device 101 is transmitted or received via the interface between the EPC 342 and the 5GC 352.

As set forth above, dual connectivity via the LTE base station 340 and the NR base station 350 may be referred to as evolved universal mobile telecommunications system (UMTS) terrestrial radio access network (E-UTRA) new radio dual connectivity (EN-DC).

Figure 4A:
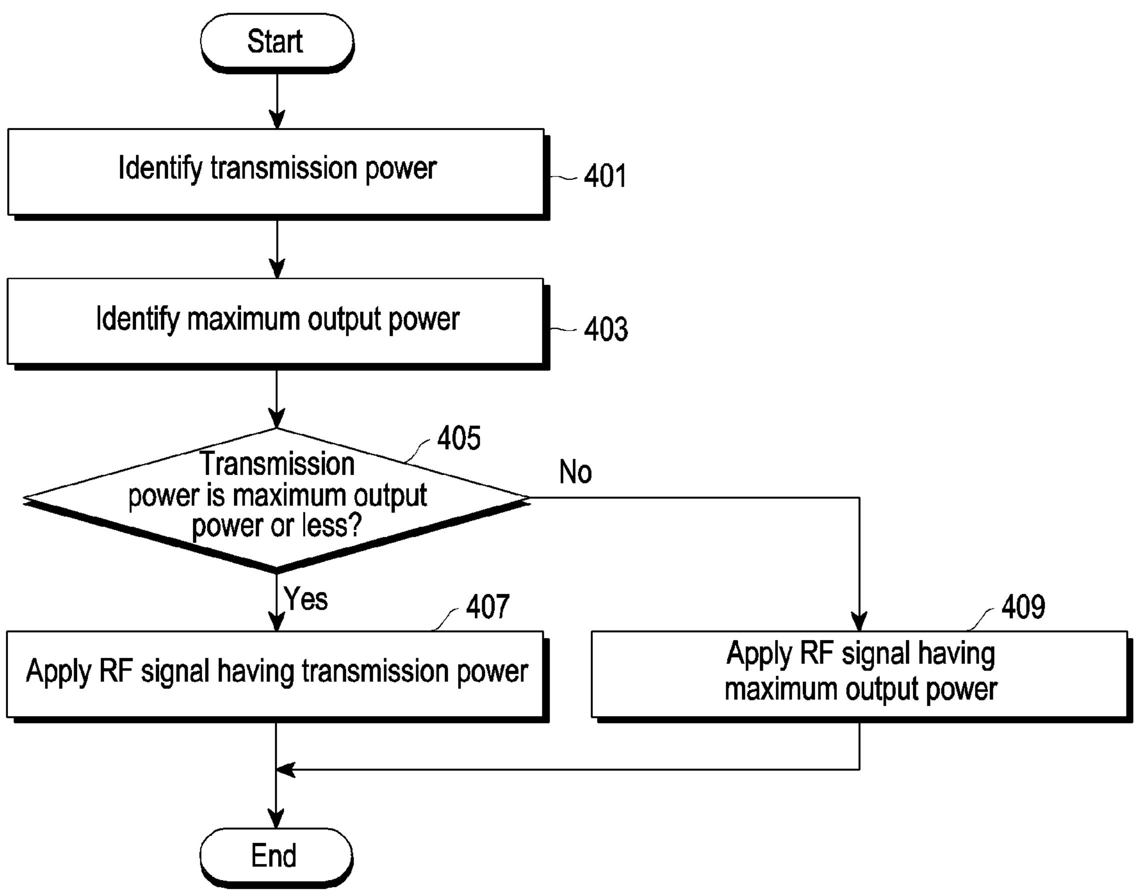
FIG. 4A is a flowchart illustrating operations of an electronic device according to a comparative example for comparison according to an embodiment of the disclosure.

FIG. 4A is a flowchart illustrating operations of an electronic device according to a comparative example for comparison according to an embodiment of the disclosure.

Meanwhile, at least some of the operations of the electronic device 101 according to the comparative example shown in FIG. 4A is also be performed by the electronic device 101 according to various embodiments.

Referring to FIG. 4A, an electronic device 101 (e.g., at least one of the processor 120, the first communication processor 212, the second communication processor 214, or the integrated communication processor 260) may identify the transmission power corresponding to the uplink signal in operation 401. The transmission power may mean, e.g., power input to a corresponding antenna port for transmission of a specific uplink signal, but is not limited thereto. For example, the electronic device 101 identifies the transmission power corresponding to a particular uplink signal (or channel) based on information received from the network and/or information identified (or determined) by the electronic device 101. For example, the electronic device 101 sets the transmission power of the physical uplink shared channel (PUSCH) for the subframe i when the radio access technology (RAT) is E-UTRA based on Equation 1 below.

$$P_{PUSCH}(i)=\min[P_{CMAX},\ 10\log_{10}(M_{PUSCH}(i))+P_{O\text{-}PUSCH}(j)+\alpha(j)\cdot PL+\Delta_{TF}(i)+f(i)] \quad \text{Equation 1}$$

$P_{CMAX}$ is the maximum output power according to the power class of the electronic device 101. For example, $P_{CMAX}$ is UE maximum output power defined in 3rd generation partnership project (3GPP) technical specification (TS) 36.101, but is not limited thereto. $M_{PUSCH}(i)$ is the number of resource blocks allocated to the electronic device 101. $P_{O\_PUSCH}(j)$ is the sum of $P_{O\_NOMINAL\_PUSCH}(j)$ (a parameter specified by the cell) and $P_{O\_UE\_PUSCH}(j)$ (a parameter specified by the electronic device 101). PL is the downlink path-loss measured by the electronic device 101. The scaling factor $\alpha(j)$ may be determined in a higher layer considering the pathloss mismatch between the uplink channel and the downlink channel $\Delta_{TF}(i)$ is the modulation and coding scheme (MCS) compensation parameter or the transport format (TF) compensation parameter. f(i) is the value adjusted by downlink control information (DCI) from the base station after initial setting. The electronic device 101 may set the smaller of $P_{CMAX}$ and the sum of $M_{PUSCH}(i)$, $P_{O\_PUSCH}(j)$, the product of the scaling factor $\alpha(j)$ and PL, $\Delta_{TF}(i)$, and f(i), as the transmission power of the PUSCH. At least some of the parameters for Equation 1 may follow, e.g., 3rd generation partnership project (3GPP) technical specification (TS) 36.213. Alternatively, the electronic device 101 may set the transmission power of the PUSCH according to 3GPP TS 38.213, e.g., when the RAT is NR. The above-described example describes the transmission power for PUSCH, but the transmission power is also set for various other cases (e.g., sounding reference signals (SRS), physical uplink control channel (PUCCH), PUSCH, and physical random access channel (PRACH)), and the method of setting the transmission power may follow, e.g., 3GPP TS 36.213 or 3GPP TS 38.213, but is not limited.

In operation 403, the electronic device 101 may identify the maximum output power. The maximum output power of the electronic device 101 may be, e.g., UE maximum output power. The UE maximum output power may be set according to the power class of the electronic device 101 based on, e.g., 3GPP TS 36.101 or 3GPP TS 38.101, but the setting scheme is not limited to a specific one. If the power class of the electronic device 101 is class 3, the UE maximum output power may be, e.g., 23 dBm. Alternatively, the maximum output power may be, e.g., the smaller value of the value set corresponding to an output power restriction event, such as SAR event, and the UE maximum output power. The electronic device 101 may manage (or identify) the output power corresponding to the SAR event that allows for compliance with the SAR restriction regulation. For example, in response to a grip event, which is one of the SAR events, 16 dBm is managed (or identified) as a limited output power. In this case, the electronic device 101 may identify, as the maximum output power, 16 dBm, which is the smaller value of the UE maximum output power (e.g., 23 dBm) and the output power (e.g., 16 dBm) corresponding to the SAR event. The event in which the output power is limited is not limited to the SAR event. For example, when dynamic power sharing (DPS) is being performed, the electronic device 101 identifies that the smaller of the UE maximum output power and the limited output power by the DPS is the maximum output power for specific RAT.

In operation 405, the electronic device 101 may identify whether the transmission power corresponding to the uplink signal identified in operation 401 is equal to or less than the maximum output power identified in operation 403. If the transmission power is equal to or less than the maximum output power (yes in operation 405), the electronic device 101 may apply an RF signal having the transmission power identified in operation 401 to the antenna port to transmit the uplink signal. In this case, transmission power corresponding to the uplink signal may not be limited. In various embodiments, it will be appreciated by one of ordinary skill in the art that when the electronic device 101 applies an RF signal having a specific transmission power to an antenna port, it may mean controlling at least one RF device (e.g., at least some of at least one RFIC 222, 224, 226, and 228 or at least one RFFE 232, 234, and 236) to apply the RF signal of the specific transmission power. If the transmission power exceeds the maximum output power (no in operation 405), the electronic device 101 may transmit the uplink signal by applying an RF signal having the maximum output power in operation 409. If the transmission power corresponding to the uplink signal corresponding to the PUSCH is identified as 20 dBm, and the maximum output power is identified as 16 dBm based on the SAR event, the electronic device 101 may apply an RF signal having a magnitude of 16 dBm to the antenna port. In this case, transmission power required by the electronic device 101 and/or the network may be limited by an event. A situation that may occur as transmission power required by the electronic device 101 and/or a network is limited by an event is described below with reference to FIGS. 4B and 4C.

Figure 4B:
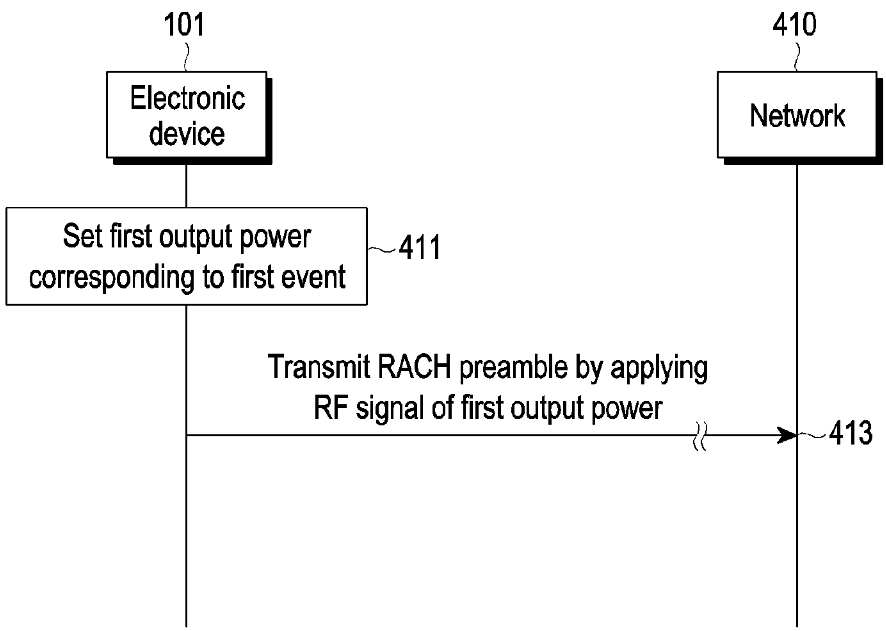
FIG. 4B is a flowchart illustrating operations of an electronic device and a network for comparison according to an embodiment of the disclosure.

FIG. 4B is a flowchart illustrating operations of an electronic device and a network for comparison according to an embodiment of the disclosure.

Meanwhile, at least some of the operations of the electronic device 101 according to the comparative example shown in FIG. 4B may also be performed by the electronic device 101 according to various embodiments.

Referring to FIG. 4B, an electronic device 101 (e.g., at least one of the processor 120, the first communication processor 212, the second communication processor 214, or the integrated communication processor 260) may set first output power corresponding to a first event in operation 411. For example, in the example of FIG. 4B, it is assumed that the electronic device 101 detects a first event (e.g., a SAR event or a DPS event) causing transmission power limitation. Further, it is assumed that the first output power corresponding to the first event is lower than the UE maximum output power. The electronic device 101 may identify transmission power corresponding to the RACH to transmit the RACH preamble. For example, the electronic device 101 identifies transmission power corresponding to RACH based on 3GPP TS 36.213 or 3GPP TS 38.213, but there is no limitation on the transmission power identification scheme. Meanwhile, the identified transmission power may exceed the first output power corresponding to the first event, and accordingly, the electronic device 101 may set the first output power corresponding to the first event to the transmission power corresponding to the RACH preamble.

In operation 413, the electronic device 101 may transmit the RACH preamble to the network 410 (e.g., the base station) by applying the RF signal having the first output power to the antenna port. For example, the electronic device 101 transmits the RACH preamble to the target cell based on a handover command or may transmit the RACH preamble in an initial access process, but the transmission conditions are not limited, and various examples are described below. However, since the first output power is a value limited corresponding to the first event, there is a possibility that the network 410 may fail to receive the RACH preamble. Accordingly, even when the electric field is relatively good, transmission power corresponding to the RACH preamble may be limited by a transmission power limitation event, such as a SAR event, so that a RACH fail may occur. If the electronic device 101 transmits the RACH preamble to the target cell based on a handover command from the network 410, the RACH fail for the above-described reasons may cause a handover failure, resulting in a radio link failure (RLF).

Figure 4C:
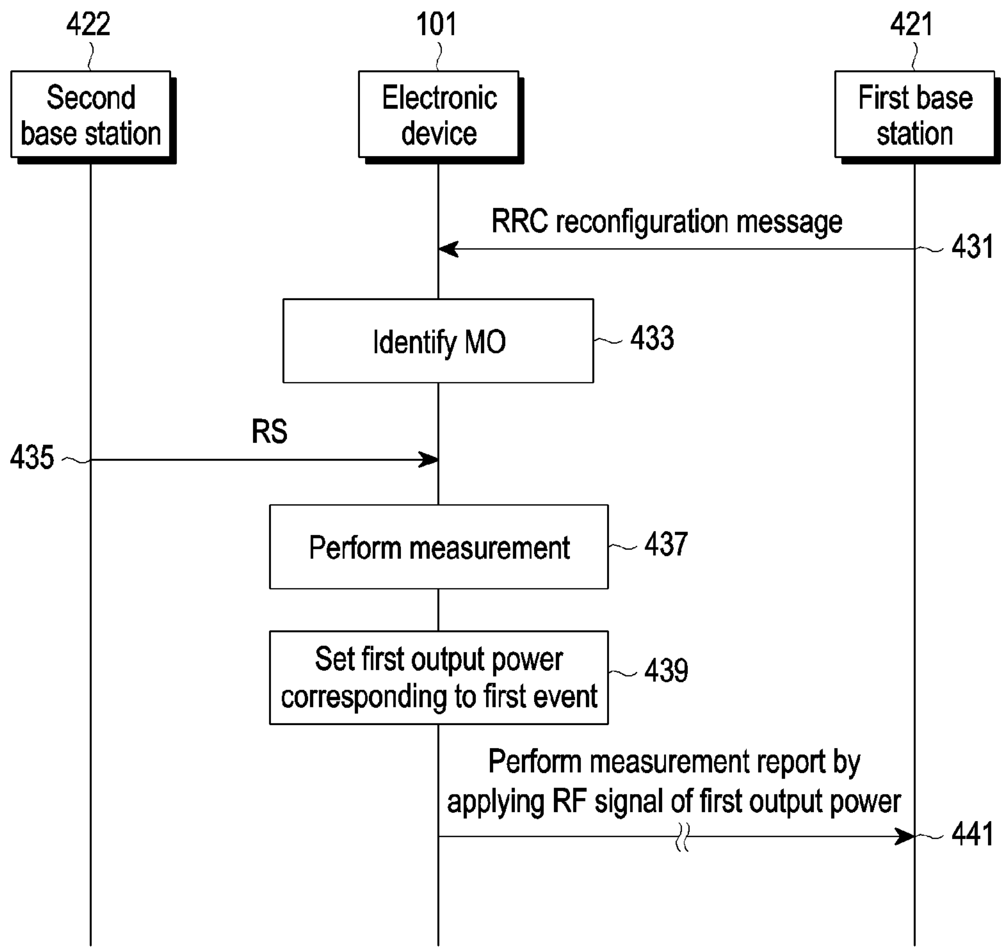
FIG. 4C is a flowchart illustrating operations of an electronic device and a network for comparison according to an embodiment of the disclosure.

FIG. 4C is a flowchart illustrating operations of an electronic device and a network for comparison according to an embodiment of the disclosure.

Meanwhile, at least some of the operations of the electronic device 101 according to the comparative example shown in FIG. 4C may also be performed by the electronic device 101 according to various embodiments.

Referring to FIG. 4C, an electronic device 101 (e.g., at least one of the processor 120, the first communication processor 212, the second communication processor 214, or the integrated communication processor 260) may receive a radio resource control (RRC) reconfiguration message including a measurement object (MO) from the first base station 421 in operation 431. For example, in FIG. 4C, the first base station 421 operates as a serving cell, and the RAT between the electronic device 101 and the first base station 421 is not limited. When the RAT is the E-UTRA, the RRC reconfiguration message may be, e.g., an RRCConnection-Reconfiguration message or an RRCConnectionResume message according to 3GPP TS 36.331 or, when the RAT is the NR, the RRC reconfiguration message may be, e.g., an RRCReconfiguration message according to 3GPP TS 38.331, but is not limited thereto.

In operation 433, the electronic device 101 may identify the MO included in the RRC reconfiguration message. The MO may include information associated with the frequency (or cell) to be measured by the UE. The information associated with the cell may include at least one of the frequency channel number, cell identification information (e.g., physical cell identifier (PCI)), black list, or per-cell offset values. The MO may include, e.g., a single NR carrier frequency or a single E-UTRA carrier frequency. The RRC reconfiguration message may include reporting configuration, and may include, e.g., a reporting criterion for performing a measurement report (MR). The RRC reconfiguration message may include at least one of the measurement ID for identifying the MO, the quantity configuration indicating the value to be measured by the UE, or the measurement gap associated with the measurement period.

In operation 435, the second base station 422 (e.g., a neighbor cell) may transmit a reference signal (RS) (or a synchronization signal (SS)). In operation 437, the electronic device 101 may perform a measurement of the magnitude (e.g., reference signal received power (RSRP), reference signal received quality (RSRQ), signal to interference noise ratio (SINR), received signal strength indicator (RSSI), and/or signal-to-noise ratio (SNR)) of the RS (or, SS) from the second base station 422. The electronic device 101 may identify that the measurement result corresponding to the second base station 422 meets the reporting criterion (e.g., A3 event or B1 event).

In operation 439, the electronic device 101 may set a transmit power corresponding to the message for performing the MR; for example, the electronic device 101 sets the first output power corresponding to the first event as the transmission power corresponding to the message for performing the MR. For example, in the example of FIG. 4C, it is assumed that the electronic device 101 detects a first event (e.g., a SAR event or a DPS event) causing transmission power limitation. Further, it is assumed that the first output power corresponding to the first event is lower than the UE maximum output power. For example, when the message for performing MR is transmitted based on the PUSCH, the electronic device 101 identifies transmission power corresponding to the PUSCH to transmit the message for performing MR. For example, the electronic device 101 identifies transmission power based on Equation 1, but there is no limitation on the transmission power identification scheme. Meanwhile, the identified transmission power may exceed the first output power corresponding to the first event, and accordingly, the electronic device 101 may set the first output power corresponding to the first event to the transmission power corresponding to the message for performing MR.

In operation 441, the electronic device 101 may perform MR by applying the RF signal having the first output power to the antenna port. However, since the first output power is a value limited corresponding to the first event, there is a possibility that the network 410 may fail to receive the message for performing MR. Accordingly, even when the electric field is relatively good, transmission power corresponding to the message for performing MR may be limited due to a transmission power limitation event, such as a SAR event, causing failure in inter-frequency hand, inter-RAT handover, and/or dual-connectivity (DC) second cell group (SCG) addition which is an operation subsequent to MR. If handover is not performed at an appropriate time, RLF may eventually occur. Or, an increase in the data rate may be limited as DC is performed although it is possible in the environment.

Figure 5A:
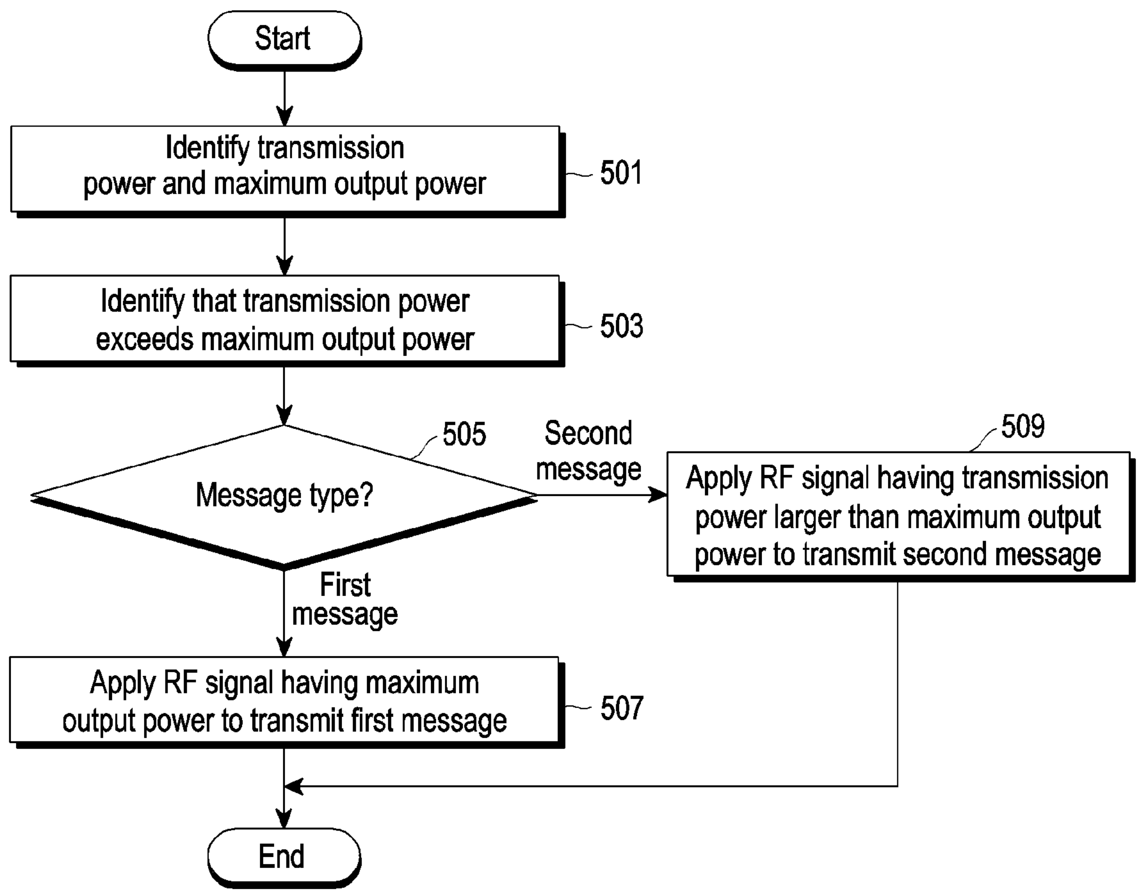
FIG. 5A is a flowchart illustrating an operation method of an electronic device according to an embodiment of the disclosure.

FIG. 5A is a flowchart illustrating an operation method of an electronic device according to an embodiment of the disclosure.

The embodiment of FIG. 5A is described with reference to FIG. 6.

Figure 6:
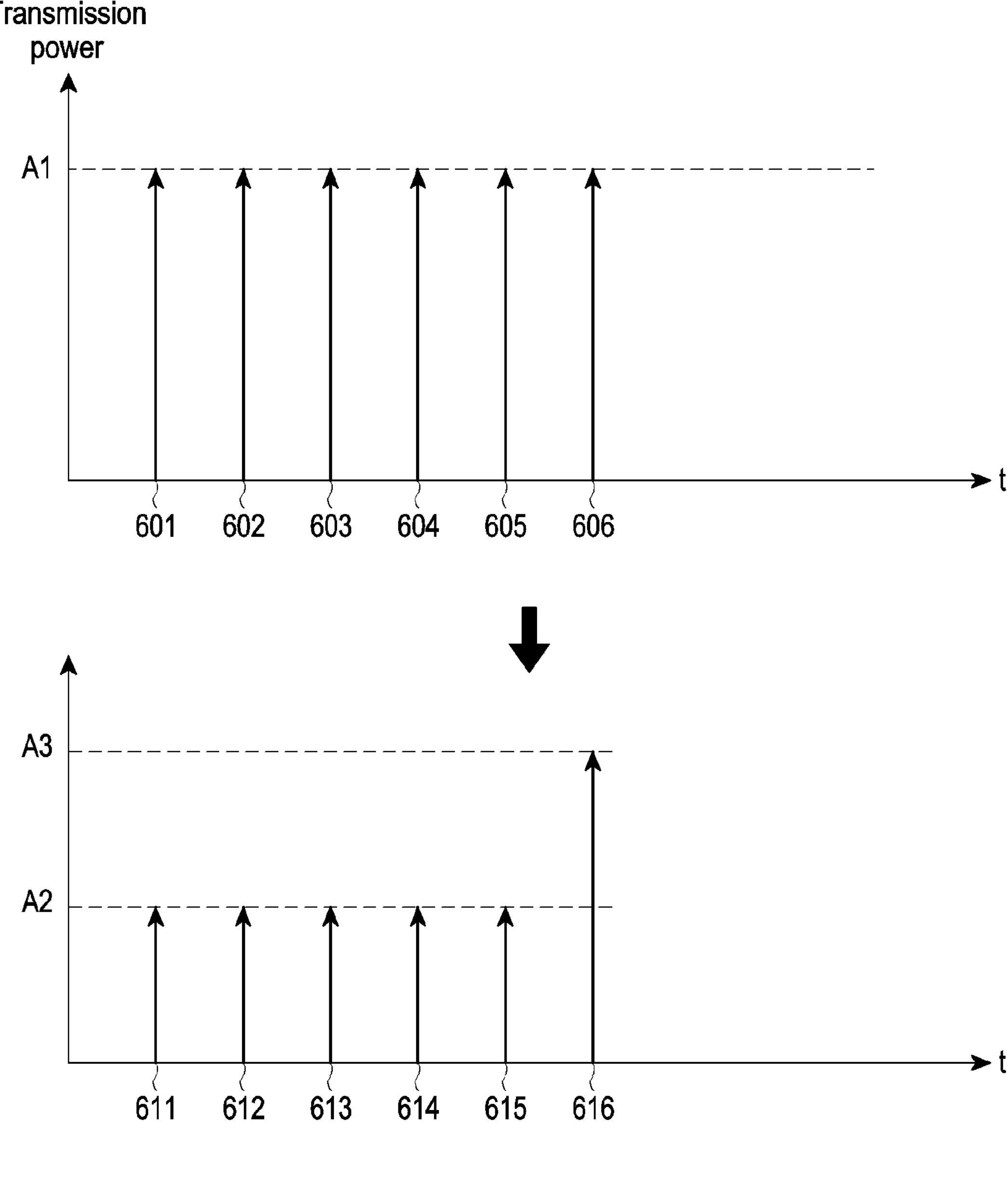
FIG. 6 illustrates an example of output power for uplink according to an embodiment of the disclosure.

FIG. 6 illustrates an example of output power for uplink according to an embodiment of the disclosure.

According to various embodiments, an electronic device 101 (e.g., at least one of the processor 120, the first communication processor 212, the second communication processor 214, or the integrated communication processor 260) may identify the transmission power and maximum output power corresponding to a message in operation 501. As described above, the electronic device 101 may identify the transmission power corresponding to a specific message based on information received from the network and/or information identified and/or stored in the electronic device 101. For example, the electronic device 101 identifies the PRACH transmission power for the RACH preamble, but the identification scheme is not limited. Meanwhile, the electronic device 101 may identify the UE maximum output power as the maximum output power when the event causing the limitation of the output power is not identified. When the event causing output power limitation is identified, the electronic device 101 may identify the smaller value of the UE maximum output power and the output power corresponding to the event as the maximum output power. For example, if a grip event occurs, the electronic device 101 identifies the output power corresponding to the grip event as the maximum output power.

According to various embodiments, in operation 503, the electronic device 101 may identify that the transmission power corresponding to the message exceeds the maximum output power. As described above, when the transmission power corresponding to the message is less than the maximum output power, the electronic device 101 may limit the transmission power corresponding to the message to the maximum output power. It has been described that the electronic device 101 according to the comparative example limits the transmission power corresponding to the message to the maximum output power for all messages collectively. In contrast to the comparative example, according to various embodiments, the electronic device 101 may limit the transmission power to the maximum output power for each type of message or set the transmission power to a value larger than the maximum output power.

According to various embodiments, in operation 505, the electronic device 101 may identify the message type. If the message type is the first message, the electronic device 101 may apply an RF signal having maximum output power to the antenna port to transmit the first message in operation 507. If the message type is the second message, the electronic device 101 may apply an RF signal having an output power larger than the maximum output power to the antenna port to transmit the second message in operation 509.

Referring to FIG. 6, the electronic device 101 may transmit a first message 601, 602, 603, 604, or 605 and a second message 606. The electronic device 101 may identify the transmission power corresponding to the first message

601, 602, 603, 604, or 605 as A1 and the transmission power corresponding to the second message 606 as A1. That the transmission power corresponding to the first messages 601, 602, 603, 604, and 605 and the transmission power corresponding to the second message 606 are the same is merely an example, and the transmission power corresponding to the first messages 601, 602, 603, 604, and 605 and the transmission power corresponding to the second message 606 may be different. The upper portion of FIG. 6 shows an example in which the transmission power corresponding to the first messages 601, 602, 603, 604, and 605 is not limited by the maximum output power, and the transmission power corresponding to the second message 606 is not limited by the maximum output power. For example, the UE maximum output power is larger than A1 and, if no special event occurs, the electronic device 101 identifies the UE maximum output power as the maximum output power. In this case, since the transmission power A1 of the message identified by the electronic device 101 is equal to or less than the maximum output power, the transmission power may not be limited. The electronic device 101 may transmit the first messages 601, 602, 603, 604, and 605 by applying the RF signal having transmission power corresponding to the first messages 601, 602, 603, 604, and 605 to the antenna port. The electronic device 101 may transmit the second message 606 by applying the RF signal having transmission power corresponding to the second message 606 to the antenna port.

The lower portion of FIG. 6 shows an example in which the transmission power corresponding to the first messages 611, 612, 613, 614, and 615 and the transmission power corresponding to the second message 616 exceed the maximum output power A2. For example, the electronic device 101 identifies an event (e.g., a grip event) that causes an output power limitation. The output power corresponding to the grip event may be A2. The electronic device 101 may identify the output power (e.g., A2) corresponding to the event, which is the smaller value of the UE maximum output power and the output power corresponding to the event as the maximum output power. In this case, the transmission power A1 of the message identified by the electronic device 101 may not exceed the maximum output power A2. When transmitting the first messages 611, 612, 613, 614, and 615, the electronic device 101 may apply the RF signal of output power A2 corresponding to the event to the antenna port. When transmitting the second message 616, the electronic device 101 may apply the RF signal having the transmission power A3 larger than A2, which is the output power corresponding to the event, to the antenna port. For a specific message (e.g., the second message 616), the electronic device 101 may not back off to the output power set corresponding to the event but transmit the message with a transmission power larger than that. As an example, the electronic device 101 transmits the first messages 611, 612, 613, 614, and 615 associated with the Internet packet data name (PDN) through the PUSCH with the output power (e.g., A2) set corresponding to the event and transmits the second message 616 for MR with the transmission power (e.g., A3) larger than the output power (e.g., A2) set corresponding to the event. The transmission power A3 may be larger than A2, which is the output power corresponding to the event, and may be smaller than A1, which is the identified transmission power of the second message 616, but this is an example, and is set to larger than or equal to A1. Schemes for determining the transmission power A3, which is larger than A2, which is the output power corresponding to the event, are described with reference to FIGS. 7 and 8. As the second message 616 (e.g., message for MR) is transmitted based on the transmission power A3 which is larger than A2 which is the output power corresponding to the event, the probability that the serving cell fails to identify the message for MR may reduce.

Meanwhile, identifying the message type by the electronic device 101 is merely an example. The electronic device 101 may separately manage a first group of messages whose transmission power is to be limited to the output power corresponding to the event and a second group of messages whose transmission power is to be set to be larger than the output power corresponding to the event in which case the message type may not be managed. When the event is detected, and the first group of messages are transmitted, the electronic device 101 may limit the transmission power to the output power corresponding to the event. When the event is detected, and the second group of messages are transmitted, the electronic device 101 may transmit the second group of messages with the transmission power value larger than the output power corresponding to the event.

Example messages to have transmission power values larger than the output power corresponding to the event although the event occurs are described below.

In one example, the electronic device 101 manages at least one message (e.g., RACH preamble) based on the PRACH as a message to have the transmission power value larger than the output power corresponding to the event although the event occurs. An RACH fail may occur when the network fails to receive at least one message based on the PRACH and, since the data size is relatively small, a transmission power value larger than the output power corresponding to the event may be set.

In one example, the electronic device 101 manages at least one message (e.g., message corresponding to the logical channel) based on the signaling radio bearer (SRB) as the message to have the transmission power value larger than the output power corresponding to the event although the event occurs. When the network fails to receive at least one message based on the SRB, an error (e.g., RLF) may occur and, since the data size is relatively small, a transmission power value larger than the output power corresponding to the event may be set. In various examples, the electronic device 101 sets a transmission power value larger than the output power corresponding to the event based on, e.g., the type of the SRB. For example, a message (e.g., message for MR, RRCReconfiguration message, or RRCReconfigurationComplete message) based on at least one of SRB0, SRB1, or SRB3 is managed as the message to have a larger transmission power value than the output power corresponding to the event although the event occurs. For example, the SRB2-based message is managed as a message limited to have the transmission power having the output power corresponding to the event when the event occurs. Meanwhile, the above-described per-SRB type classifications are merely an example, and embodiments are not limited.

In one example, the electronic device 101 may manage at least one message based on data radio bearer (DRB) as the message limited to have the transmission power having the output power corresponding to the event when the event occurs.

Figure 5B:
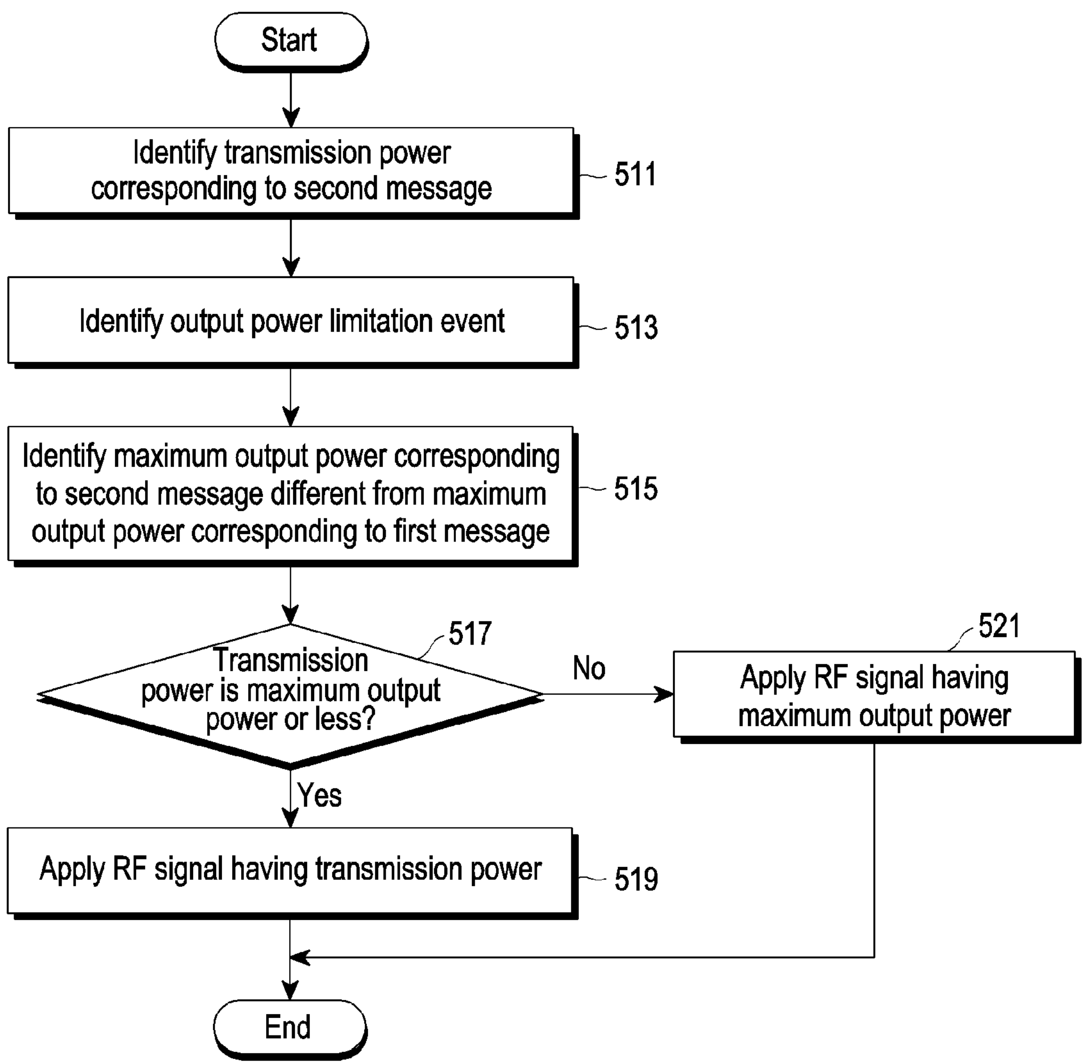
FIG. 5B is a flowchart illustrating an operation method of an electronic device according to an embodiment of the disclosure.

FIG. 5B is a flowchart illustrating an operation method of an electronic device according to an embodiment of the disclosure.

Referring to FIG. 5B, an electronic device 101 (e.g., at least one of the processor 120, the first communication processor 212, the second communication processor 214, or the integrated communication processor 260) may identify the transmission power corresponding to the second message in operation 511. In operation 513, the electronic device 101 may identify an output power limitation event. In operation 515, the electronic device 101 may identify the maximum output power corresponding to the second message different from the maximum output power corresponding to the first message. The electronic device 101 may manage two maximum output powers for one output power limitation event. For example, the electronic device 101 sets a maximum output power of 16 dBm corresponding to at least one first message (e.g., DRB-based message or SRB1-based message) and set a maximum output power of 23 dBm corresponding to at least one second message (e.g., message based on SRB0, SRB1, or SRB3) in response to a grip event.

According to various embodiments, in operation 517, the electronic device 101 may identify whether the transmission power is the maximum output power or less. When the transmission power is the maximum output power or less (yes in operation 517), the electronic device 101 may transmit the second message by applying the RF signal having the transmission power in operation 519. When the transmission power exceeds the maximum output power (no in operation 517), the electronic device 101 may transmit the second message by applying an RF signal having the maximum output power in operation 521. For example, if a grip event is identified when transmitting the message for MR, the electronic device 101 transmits the message for MR by applying the RF signal of 23 dBm set corresponding to the second message. For example, if a grip event is identified when transmitting the DRB-based message, the electronic device 101 transmits the DRB-based message by applying the RF signal of 16 dBm set corresponding to the first message. Accordingly, as the message causing an error (RACH failure or RLF) when lost is transmitted with a relatively large magnitude although an SAR-associated event occurs, stable communication may be possible. Further, as relatively multiple first messages are transmitted in a backed-off magnitude, relatively few second messages alone are transmitted in a relatively large magnitude, so that it is possible to observe SAR restriction rules.

As described above in detail with reference to FIG. 5A, the electronic device 101 may set one output power for one event, set an output power set for an event for a first type of message (or belonging to the first group) when the event occurs, and set a transmission power higher than the output power set for the event for a second type of message (or belonging to the second group). As described above in detail with reference to FIG. 5B, the electronic device 101 may be implemented to set a first output power set for the event for the first type of message (or belonging to the first group) for one event and set two output powers set for the event for the second type of message (or belonging to the second group). Meanwhile, the classification to the above-described two types (or groups) is merely an example, and there is no limit to the number of classifications.

Figure 7:
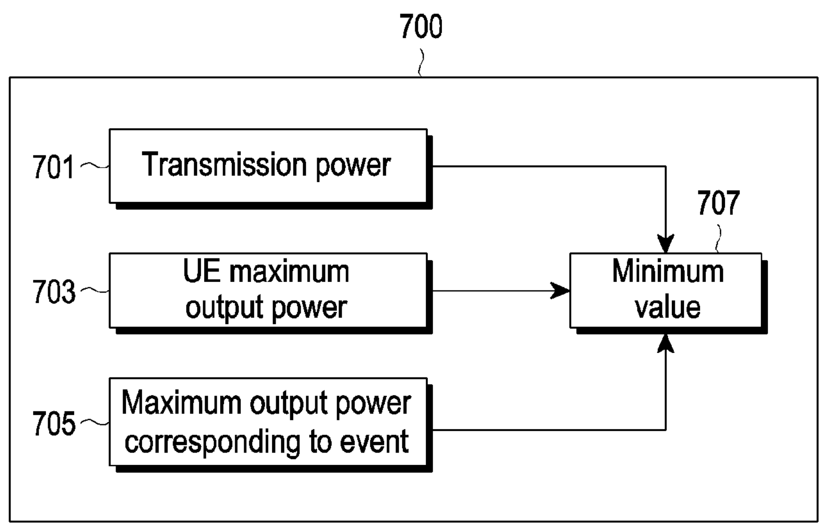
FIG. 7 is a block diagram illustrating determination of transmission power corresponding to a message according to an embodiment of the disclosure.

FIG. 7 is a block diagram illustrating determination of transmission power corresponding to a message according to an embodiment of the disclosure.

Referring to FIG. 7, a transmission power determination module 700 may determine the transmission power 701 for a specific message. The transmission power determination module 700 may mean, e.g., an algorithm (or program) performed by at least one of the processor 120, the first communication processor 212, the second communication processor 214, or the integrated communication processor 260 or a hardware module (i.e., the transmission power determination module 700) included in at least one of the processor 120, the first communication processor 212, the second communication processor 214, or the integrated communication processor 260. The operation of the transmission power determination module 700 may be understood as being performed by at least one of the processor 120, the first communication processor 212, the second communication processor 214, or the integrated communication processor 260. The transmission power determination module 700 may set transmission power corresponding to a specific message based on, e.g., 3GPP TS 36.213 or 3GPP TS 38.213, but is not limited thereto.

According to various embodiments, the transmission power determination module 700 may identify the UE maximum output power 703. The UE maximum output power 703 may be set based on the power class of the electronic device 101, and may follow, e.g., 3GPP TS 36.101 or 3GPP TS 38.101, but is not limited thereto. The transmission power determination module 700 may identify the maximum output power 705 corresponding to the event. In the electronic device 101, at least one event for limiting transmission power may be set, and a maximum output power for each of the at least one event may be set. For example, for a grip event, a maximum output power of 16 dBm is set. The UE maximum output power 703 may be referenced by the transmission power determination module 700 when a corresponding event occurs, and may not be referenced when the corresponding event does not occur.

According to various embodiments, the transmission power determination module 700 may select the minimum value 707 from among the transmission power 701, the UE maximum output power 703, and the maximum output power 705 corresponding to the event to determine the transmission power of the first type of message (or belonging to the first group). The transmission power determination module 700 may select the minimum value 707 from among the transmission power 701 and the UE maximum output power 703 to determine the transmission power of the second type of message (or belonging to the second group).

Figure 8:
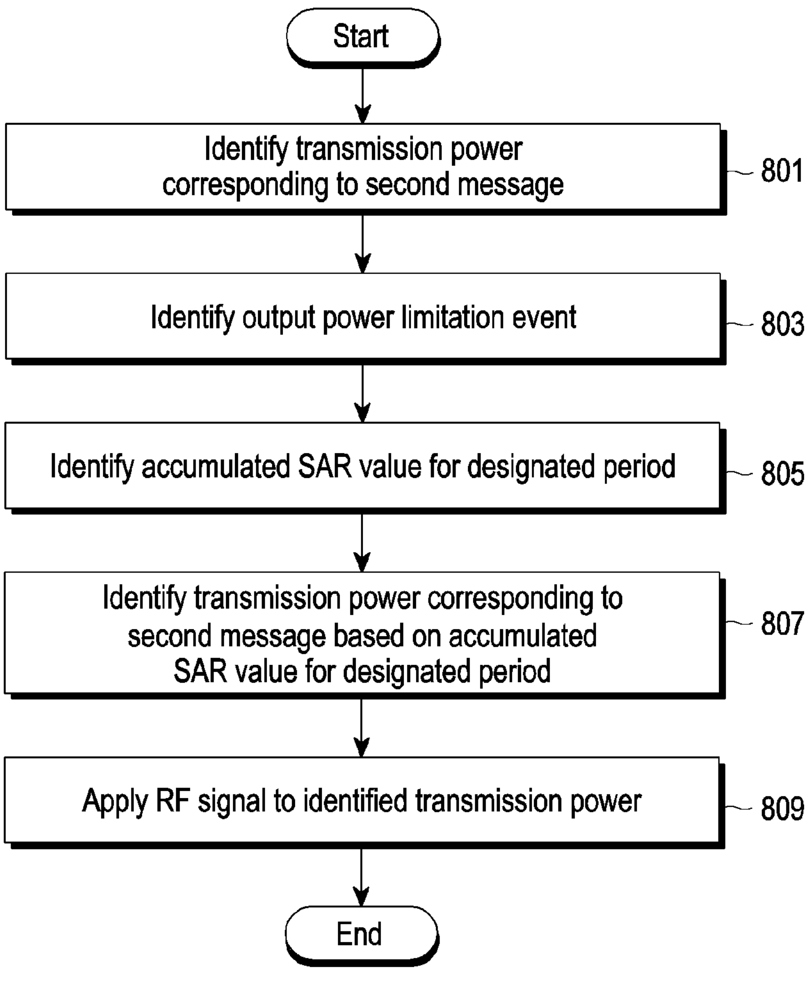
FIG. 8 is a flowchart illustrating an operation method of an electronic device according to an embodiment of the disclosure.

FIG. 8 is a flowchart illustrating an operation method of an electronic device according to an embodiment of the disclosure.

Referring to FIG. 8, an electronic device 101 (e.g., at least one of the processor 120, the first communication processor 212, the second communication processor 214, or the integrated communication processor 260) may identify the transmission power corresponding to the second message in operation 801. In operation 803, the electronic device 101 may identify an output power limitation event. For example, in the embodiment of FIG. 8, it is assumed that the electronic device 101 sets one output power corresponding to the first message for the output power limitation event.

According to various embodiments, in operation 805, the electronic device 101 may identify an SAR value accumulated for a designated period. The electronic device 101 may store information about power input to an antenna for radiation of a communication signal transmitted in the past. The information about the power input to the antenna may be expressed in, e.g., dBm or watt (W), but the unit is not limited. In various embodiments, the electronic device 101 may store information about the power radiated from the antenna, and may use any magnitude of power associated with SAR without limitation. The electronic device 101 may store information about transmission strength corresponding to each network communication signal for a designated time period. The electronic device 101 may identify the accumulated SAR value based on the information about the transmission strength of the communication signal. For example, the electronic device 101 identifies SAR values in a plurality of sub time periods, respectively, in a designated time period, and sum the SAR values in the plurality of sub time periods, respectively, to identify the accumulated SAR value. In another embodiment, the electronic device 101 may manage the accumulated SAR value in such a manner as to store only the accumulated SAR value at a past time in a designated period and update it.

According to various embodiments, in operation 807, the electronic device 101 may identify the transmission power corresponding to the second message based on the accumulated SAR value for the designated period. In operation 809, the electronic device 101 may transmit the second message by applying the RF signal of the identified transmission power. The electronic device 101 may be configured to select the smaller value of the transmission power identified based on the accumulated SAR value and the transmission power identified in operation 801. The electronic device 101 may determine the transmission power corresponding to the second message so that the sum of the accumulated SAR value for the designated period and the SAR by the second message at the current time meets the SAR restriction rule. The electronic device 101 may determine the transmission power corresponding to the second message so that the sum of, e.g., the accumulated SAR value in the past for the designated period, an SAR value predicted in the future, and the SAR by the second message meets the SAR restriction rule. For example, the electronic device 101 predicts the accumulated SAR value for a designated time period (e.g., 50 seconds) at least one future time based on the accumulated SAR value. For example, the electronic device 101 predicts the accumulated SAR value for 50 seconds which is the designated time period at a first future time which is 0.5 seconds after and predict the SAR accumulated for 50 seconds at each of the second future time to 50th future time which are respectively 0.1 seconds to 49.5 seconds after. To predict the SAR accumulated for the designated time period at the future time, the electronic device 101 may use at least part of the accumulated SAR at the past time. The electronic device 101 may identify the transmission power corresponding to the second message where the SAR restriction rule is met at all of the plurality of future times based on the SAR predicted at each of the plurality of future times and the SAR accumulated at the past time. For example, the electronic device 101 sets the SAR sum predicted based on the accumulated SAR as the maximum value within the limit where it meets the SAR restriction rule.

Figure 9:
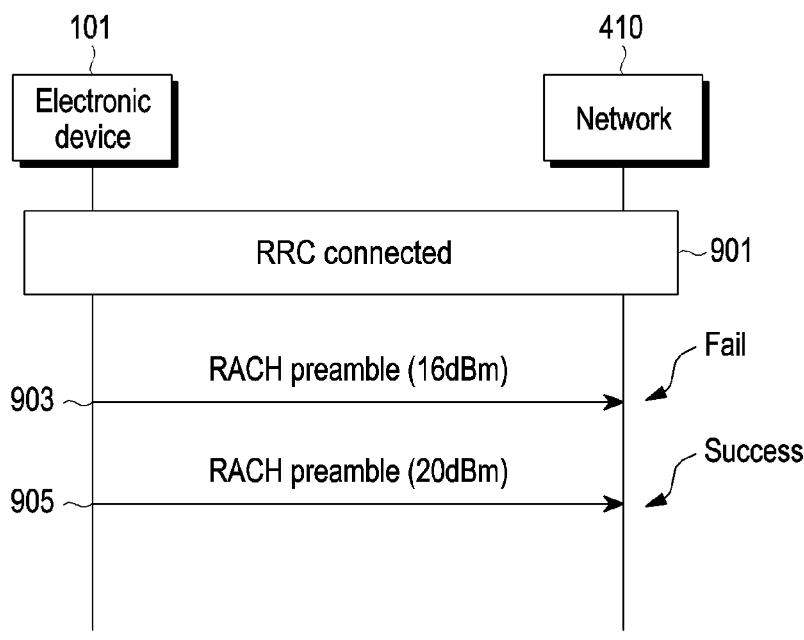
FIG. 9 is a flowchart illustrating an operation method of an electronic device according to an embodiment of the disclosure.

FIG. 9 is a flowchart illustrating an operation method of an electronic device according to an embodiment of the disclosure.

Referring to FIG. 9, an electronic device 101 (e.g., at least one of the processor 120, the first communication processor 212, the second communication processor 214, or the integrated communication processor 260) may be in an RRC connected state with the network 410 in operation 901. The electronic device 101 may identify a trigger of an RACH procedure. For example, the electronic device 101 transmits the RACH preamble based on at least one trigger among an RRC connection re-establishment procedure, a handover procedure, receipt of DL or UL data when the UL synchronization state is "non-synchronized", establishment of time alignment in secondary cell (SCell) addition, a request for other system information (SI), beam failure recovery, positioning, or secondary timing advance group (sTAG) management. Alternatively, although not shown, the electronic device 101 may transmit the RACH preamble on initial access in the RRC idle state, or may transmit the RACH preamble based on a transition from RRC inactive. The electronic device 101 may identify the transmission power of the RACH preamble as, e.g., 20 dBm.

According to various embodiments, the electronic device 101 may detect an event causing transmission power limitation. The output power corresponding to the corresponding event may be, e.g., 16 dBm. The electronic device 101 may identify that, e.g., 20 dBm, the transmission power of the RACH preamble, exceeds 16 dBm, the output power corresponding to the corresponding event. In this embodiment, in operation 903, the electronic device 101 may transmit the RACH preamble by first applying an RF signal of 16 dBm, which is an output power corresponding to a corresponding event. Due to the a relatively small magnitude of transmission power, the network 410 may fail to identify the RACH preamble from the electronic device 101. The electronic device 101 may fail to receive a message (e.g., MSG2) corresponding to the RACH preamble.

According to various embodiments, the electronic device 101 may transmit the RACH preamble again in operation 905 based on failure to receive the message corresponding to the RACH preamble. In this case, the electronic device 101 may set the transmission power of the RACH preamble to be larger than 16 dBm, which is the output power corresponding to the event. For example, the electronic device 101 determines the transmission strength of the RACH preamble according to the scheme described in connection with FIG. 7 or 8, but the determination scheme is not limited. As relatively greater transmission power is used, the network 410 may succeed in receiving the RACH preamble, and accordingly, the RACH procedure may proceed.

Figure 10:
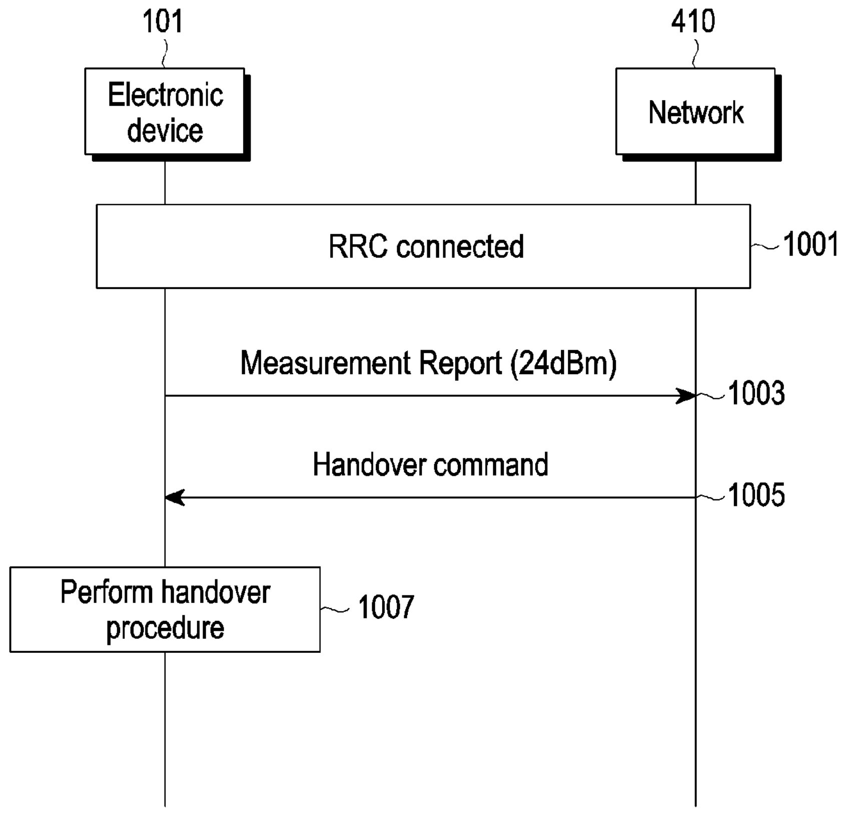
FIG. 10 is a flowchart illustrating an operation method of an electronic device according to an embodiment of the disclosure.

FIG. 10 is a flowchart illustrating an operation method of an electronic device according to an embodiment of the disclosure.

Referring to FIG. 10, an electronic device 101 (e.g., at least one of the processor 120, the first communication processor 212, the second communication processor 214, or the integrated communication processor 260) may be in an RRC connected state with the network 410 in operation 1001. The electronic device 101 may receive, e.g., an RRC reconfiguration message including the MO and identify the MO. The electronic device 101 may measure the strength of the reference signal (or synchronization signal) from a neighboring cell. The electronic device 101 may identify that the measurement result meets the reporting criterion (e.g., A3 event or B1 event). Based on the reporting criterion being met, the electronic device 101 may transmit a message for measurement report (MR) to the network 410 in operation 1003. Meanwhile, it is assumed that the electronic device 101 detects an event to limit the transmission power. The electronic device 101 may set an output power of, e.g., 16 dBm for the corresponding event.

For example, when the electronic device 101 performs MR for inter-frequency handover or inter-RAT handover, the electronic device 101 transmits a message for MR to the serving cell based on, e.g., SRB1. The electronic device 101 may apply an RF signal having a transmission power of 24 dBm larger than 16 dBm corresponding to the corresponding event based on transmission of the SRB1-based message. Alternatively, e.g., when the electronic device 101 performs MR for E-UTRA NR dual-connectivity (EN-DC), the electronic device 101 may transmit a message for MR to the gNB based on, e.g., SRB3. The electronic device 101 may apply an RF signal having a transmission power of 24 dBm larger than 16 dBm corresponding to the corresponding event based on transmission of the SRB1-based message.

According to various embodiments, as a message for an MR having a relatively large size is transmitted, the possibility that the network 410 will not receive the message for the MR may reduce. The network 410 may transmit a handover command to the electronic device 101 based on reception of the message for MR in operation 1005. The electronic device 101 may perform a handover procedure based on reception of the handover command in operation 1007. Although not shown, the electronic device 101 may perform a procedure for SCG addition with the network 410.

Figure 11:
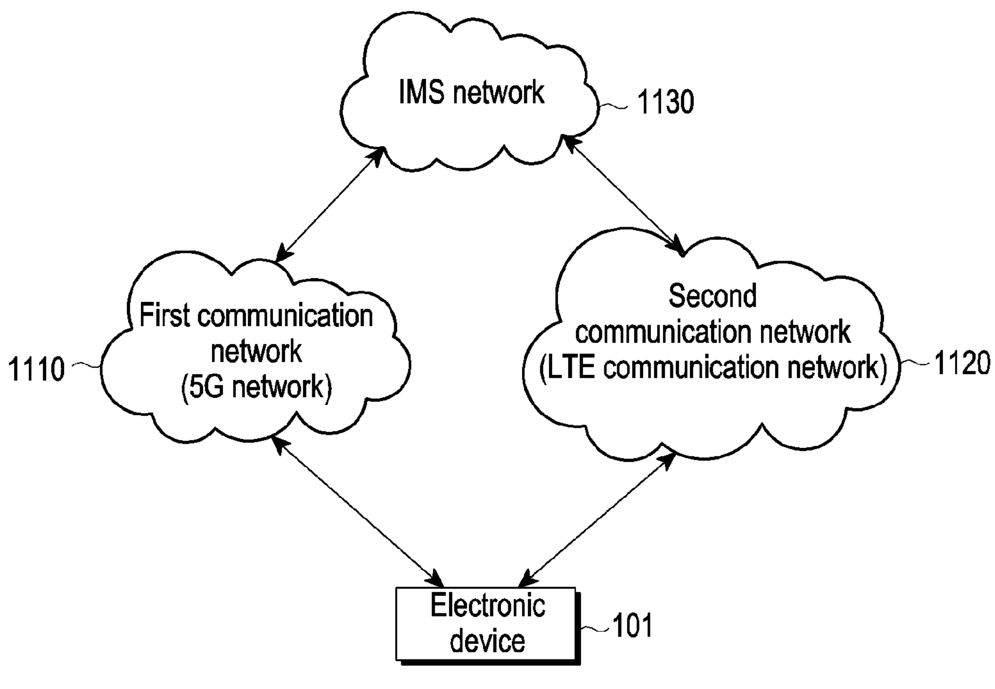
FIG. 11 illustrates a communication system including an IP multimedia subsystem (IMS) network according to an embodiment of the disclosure.

FIG. 11 illustrates a communication system including an IMS network according to an embodiment of the disclosure.

Referring to FIG. 11, the electronic device 101 may individually or simultaneously access a first communication network 1110 (e.g., a 5G NR communication network) or a second communication network 1120 (e.g., an LTE communication network). Further, the electronic device 101 may access an IMS network 1130 through the first communication network 1110 or the IMS network 1130 through the second communication network 1120. Each of the first communication network 1110 and the second communication network 1120 may include a (R)AN and/or a core network. The electronic device 101 may provide a communication service (e.g., voice call or voice call service) with another electronic device based on the first communication network 1110 and the second communication network 1120.

According to various embodiments, the electronic device 101 may modulate or demodulate the signal for communicating with at least one communication network (e.g., the first communication network 1110) through the communication module 190. For example, the electronic device 101 is connected with at least one communication network through wireless or wired communication to communicate with other electronic devices. The electronic device 101 may control communication with at least one communication network or at least one IP service network. According to an embodiment, the electronic device 101 may include hardware including at least one processor and software for controlling the hardware. The electronic device 101 may receive a communication service through the first communication network 1110 and the second communication network 1120 or the IMS network 1130.

According to various embodiments, the first communication network 1110 may include a gNB and a 5GC. The gNB may be a device (e.g., a base station) that provides a wireless interface (or wireless connection) between at least one user device and an NR network. For example, the gNB controls the wireless connection of the electronic device 101 and may control radio resources (e.g., frequencies) allocated to the radio connection. The GC may manage a connection to at least one electronic device 101 connected through the gNB. For example, the GC provides authentication for the electronic device 101 or track or manage mobility of the electronic device 101 and provide a communication service when the electronic device 101 attaches to the 5G communication network. The 5GC may route the packets communicated with the 5G communication network and an external communication network (e.g., the Internet or IMS network 1130). The electronic device 101 may transmit/receive RTP packets including voice information to/from the external electronic device through, e.g., the gNB, 5GC, and IMS network 430. A call based on a 5G communication network may be referred to as voice over NR (VoNR).

According to various embodiments, the second communication network 1120 may include an evolved node B (eNB) and an evolved packet core (EPC). The eNB may be a device (e.g., a base station) that provides a wireless interface (or wireless connection) between at least one user device and an LTE network. For example, the eNB controls the wireless connection of the electronic device 101 and may control radio resources (e.g., frequencies) allocated to the radio connection. The EPC may manage a connection to at least one electronic device 101 connected through the eNB. For example, the EPC provides authentication for the electronic device 101 or track or manage mobility of the electronic device 101 and provide a communication service when the electronic device 101 attaches to the LTE communication network. The EPC may include a serving gateway (S-GW) and a public data network gateway (PGW). For example, the EPC routes packets communicating with the LTE communication network and an external communication network (e.g., the Internet or IMS network 1130), provide a firewall, or allocate an address (e.g., IP address) to at least one user device. The electronic device 101 may transmit/receive RTP packets including voice information to/from the external electronic device through, e.g., the eNB, EPC, and IMS network 430. A call based on an LTE communication network may be referred to as voice over LTE (VoLTE).

According to various embodiments, the IMS network 1130 may include entities, such as a call session control function (CSCF) and an application server (AS). For example, the IMS network 1130 is an IP service network and provides IP-based multimedia services to subscribers. The CSCF may include at least one of, e.g., a proxy call session control function (P-CSCF), a serving call session control function (S-CSCF), or an interrogating call session control function (I-CSCF). For example, the CSCF registers the electronic device 101 with the IMS network 1130 in response to a registration request from the electronic device 101. Further, the CSCF may provide a function related to a call connection of the IMS network 1130. The AS is a device for supporting the service provided through the IMS network 1130 and may include, e.g., a telephony application server (TAS) or a voice call continuity (VCC) server. The TAS may provide a multimedia additional service (e.g., caller ID display or ring tone) to at least one electronic device 101. The VCC server may provide seamless handover between heterogeneous networks (e.g., a code division multiple access (CDMA) network and an IMS network) to at least one user device.

According to various embodiments, the electronic device 101 may be registered with the IMS network 1130 through the first communication network 1110 or the second communication network 1120. For example, the electronic device 101 transmits a registration request (e.g., attach) to the first communication network 1110 or the second communication network 1120. The first communication network 1110 or the second communication network 1120 may allocate at least one address (e.g., an IP address) to the electronic device 101 in response to the registration request. The electronic device 101 may transmit a registration request (e.g., a session initiation protocol (SIP) register) to the IMS network 1130 according to the at least one address. The IMS network 1130 may register the electronic device 101 with the IMS network 1130 and provide a service in response to the registration request.

Figure 12:
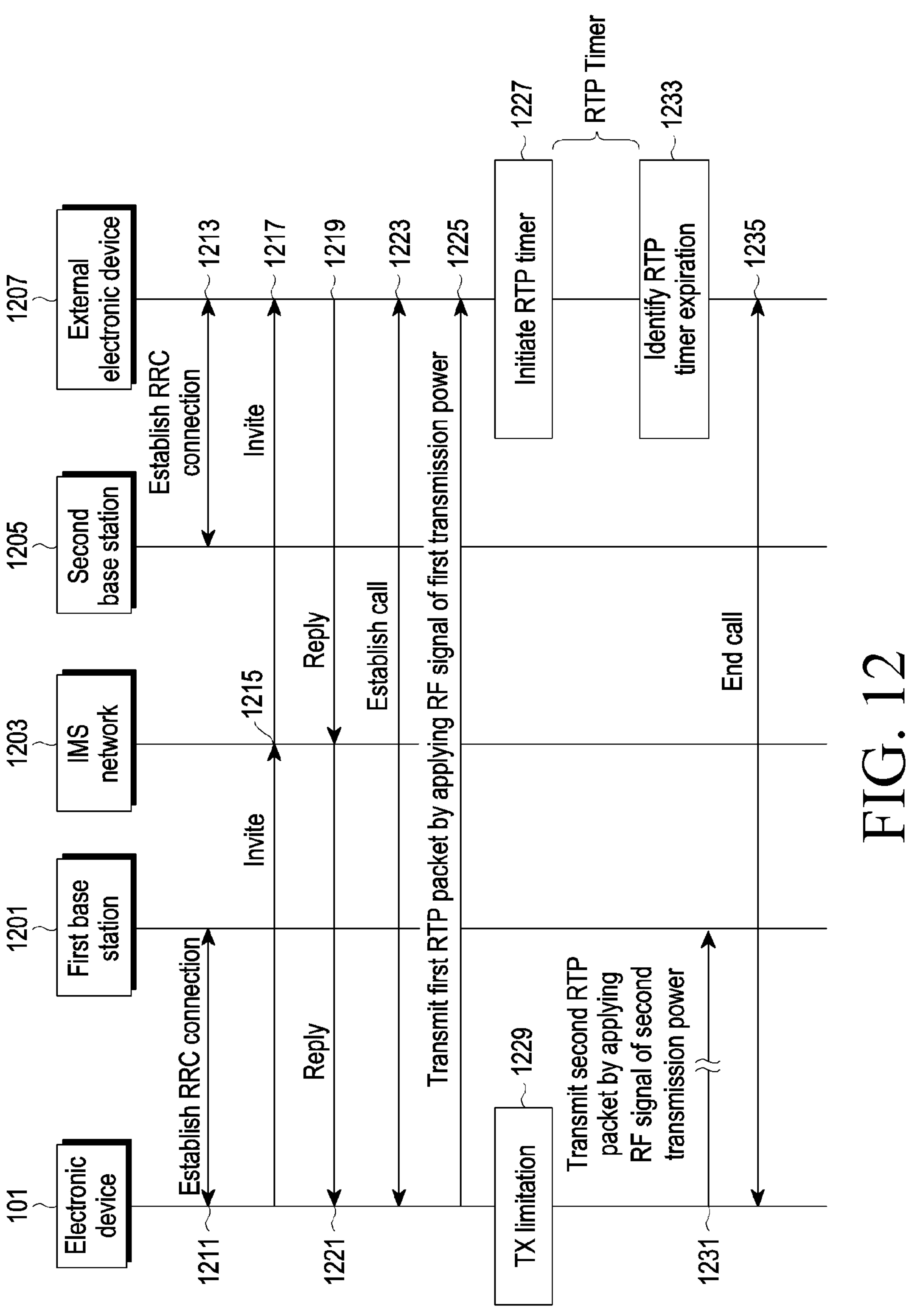
FIG. 12 is a flowchart illustrating operations of an electronic device according to an embodiment of the disclosure.

FIG. 12 is a flowchart illustrating operations of an electronic device according to a comparative example for comparison according to an embodiment of the disclosure.

According to various embodiments, the electronic device 101 may perform at least some of the operations according to the comparative example of FIG. 12.

Referring to FIG. 12, in operation 1211, the electronic device 101 may establish an RRC connection with the first base station 1201. In operation 1213, the external electronic device 1207 may establish an RRC connection with the second base station 1205. For example, there is no limitation on the radio access technology (RAT) supported by the first base station 1201 and the second base station 1205, and it is either E-UTRA or NR without limitations. The electronic device 101 and the external electronic device 1207 may establish an RRC connection based on a procedure according to, e.g., 3GPP TS 36.331 or 3GPP TS 38.331, but there is no limitation. The electronic device 101 and the external electronic device 1207 may be registered with the IMS network 1203 through the established RRC connection. In the comparative example of FIG. 12, it is assumed that the electronic device 101 and the external electronic device 1207 are registered with the IMS network 1203.

According to the comparison example, in operation 1215, the electronic device 101 may transmit an invite message associated with the external electronic device 1207 to the IMS network 1203. For example, the electronic device 101 transmits an invite message based on the execution of a multimedia transmission/reception-related application and/or a multimedia transmission/reception command. The invite message may be transmitted from the electronic device 101 to the IMS network 1203 based on, e.g., the RRC connection and the core network corresponding to the first base station 1201. For example, in FIG. 12, it is assumed that the electronic device 101 is a mobile originating (MO) device, and the external electronic device 1207 is a mobile terminating (MT) device, but it will be appreciated by one of ordinary skill in the art that the electronic device 101 is an MT device. In operation 1217, the IMS network 1203 may transmit an invite message to the external electronic device 1207. The invite message may be transmitted from the IMS network 1203 to the external electronic device 1207 based on, e.g., the RRC connection and the core network corresponding to the second base station 1205. In operation 1219, the external electronic device 1207 may transmit a reply message to the IMS network 1203. The reply message may be transmitted from the external electronic device 1207 to the IMS network 1203 based on, e.g., the RRC connection and the core network corresponding to the second base station 1205. In operation 1221, the IMS network 407 may transmit a reply message to the electronic device 101. The reply message may be transmitted from the IMS network 1203 to the electronic device 101 based on, e.g., the RRC connection and the core network corresponding to the first base station 1201. Accordingly, in operation 1223, a call (VoLTE call or VoNR call) may be established between the electronic device 101 and the external electronic device 1207.

According to the comparative example, in operation 1225, the electronic device 101 may transmit an RTP packet to the external electronic device 1207 by applying an RF signal having the first transmission power. The first transmission power is, e.g., the transmission power required by the electronic device 101 and/or the network (e.g., the first base station 1201) and may be set based on 3GPP TS 36.211 or 3GPP TS 38.211 as described above. The RTP packet may include, e.g., information for playing multimedia, and the external electronic device 1207 may play multimedia, e.g., output a voice signal, based on the received RTP packet. The external electronic device 1207 may start an RTP timer based on the reception of the RTP packet in operation 1227. The starting condition of the RTP timer may be reception of an RTP packet, and the established call may be terminated according to expiration of the RTP timer.

According to the comparative example, in operation 1229, the transmission power of the electronic device 101 may be limited. For example, the electronic device 101 detects an event (e.g., SAR event or DPS event) that causes transmission power limitation, and in response thereto, the electronic device 101 may reduce the transmission power to the output power corresponding to the event. Alternatively, when the electronic device 101 is in a weak electric field, the transmission power required by the electronic device 101 and/or the network (e.g., the first base station 1201) may be increased, and the increased transmission power may exceed the UE maximum output power. In other various situations that that described above, the transmission power of the electronic device 101 may exceed the maximum output power. In operation 1231, the electronic device 101 may transmit the second RTP packet by applying an RF signal having limited second transmission power. Due to the application of the RF signal with limited transmission power, the first base station 1201 may fail to receive the second RTP packet. Accordingly, even the external electronic device 1207 may fail to receive the second RTP packet. In operation 1233, the external electronic device 1207 may identify expiration of the RTP timer. Based on expiration of the RTP timer, in operation 1235, the call may be terminated. Accordingly, when a SAR event occurs, there is a possibility that the call is terminated. Meanwhile, the RTP packet may have a large data size as compared to messages of the second type of messages (e.g., messages based on SRB0, SRB1, and SRB3) (or belonging to the second group). Accordingly, when the transmission power corresponding to the RTP packet is set to be larger than the output power set corresponding to the event, there is a possibility that the SAR restriction rule may not be met. According to various embodiments, the electronic device 101 may adjust the bitrate (e.g., bitrate associated with AMR-WB) for generating RTP packets while transmission power is limited so that the possibility of call termination may decrease. This is described below.

Figure 13:
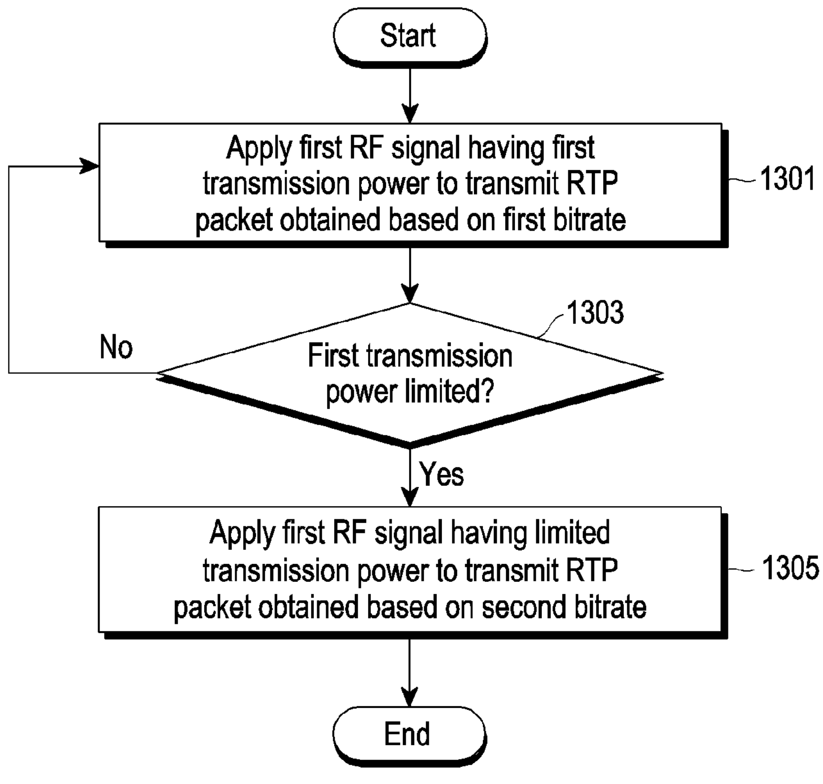
FIG. 13 is a flowchart illustrating an operation method of an electronic device according to an embodiment of the disclosure.

FIG. 13 is a flowchart illustrating an operation method of an electronic device according to an embodiment of the disclosure.

Referring to FIG. 13, the electronic device 101 (e.g., at least one of the processor 120, the first communication processor 212, the second communication processor 214, or the integrated communication processor 260) may apply a first RF signal having a first transmission power to transmit an RTP packet obtained based on a first bitrate in operation 1301. For example, the electronic device 101 receives sound signal using a microphone. The electronic device 101 may perform echo canceling and/or noise suppression on the received sound signal. The processed sound signal may be provided to the encoder of the electronic device 101. For example, the encoder determines whether voice is included in the sound signal using, e.g., VAD. For example, when the voice signal is included in the sound signal, the encoder encodes the sound signal at the first bitrate. The first bitrate may be, e.g., a bitrate set for the case where the transmission power is not limited or a bitrate set in a previous procedure. The encoder may transfer the encoded sound signal to the packetizer. The packetizer may generate RTP packets including, e.g., the encoded sound signal. The packetizer may generate RTP packets from the data received from the encoder. For example, the packetizer generates at least one RTP packet by adding a header to the encoded sound signal. The electronic device 101 may transmit the RTP packet to the external electronic device 1207 by applying the RF signal having the first transmission power not limited.

In operation 1303, the electronic device 101 may identify whether the first transmission power is limited. For example, the electronic device 101 identifies whether the first transmission power is larger than the maximum output power. When the first transmission power is not limited (no in operation 1303), the electronic device 101 may maintain application of the RF signal of the first transmission power. Meanwhile, one of ordinary skill in the art will understand that the first transmission power may change over time.

According to various embodiments, when the first transmission power is limited (yes in operation 1303), the electronic device 101 may apply the first RF signal having the limited transmission power to transmit the RTP packet obtained based on the second bitrate in operation 1305. For example, when a SAR event occurs or in a weak electric field situation, the first transmission power exceeds the maximum output power. The electronic device 101 may transmit the RTP packet by applying the first RF signal having the limited transmission power. In this case, the electronic device 101 may generate the RTP packet based on a second bitrate smaller than the first bitrate. For example, the encoder encodes the sound signal based on the second bitrate smaller than the first bitrate. As described above, when the transmission power is limited, an error may be more likely to occur. In this case, the electronic device 101 may reduce the size of the packet by reducing the bitrate for generating the packet. As the size of the packet decreases, the probability that the packet contains an error bit may decrease.

Although not shown, the electronic device 101 may further reduce the bitrate (e.g., change from the second bitrate to a third bitrate smaller than the second bitrate) or increase the bitrate (e.g., change from the second bitrate to the first bitrate).

Figure 14:
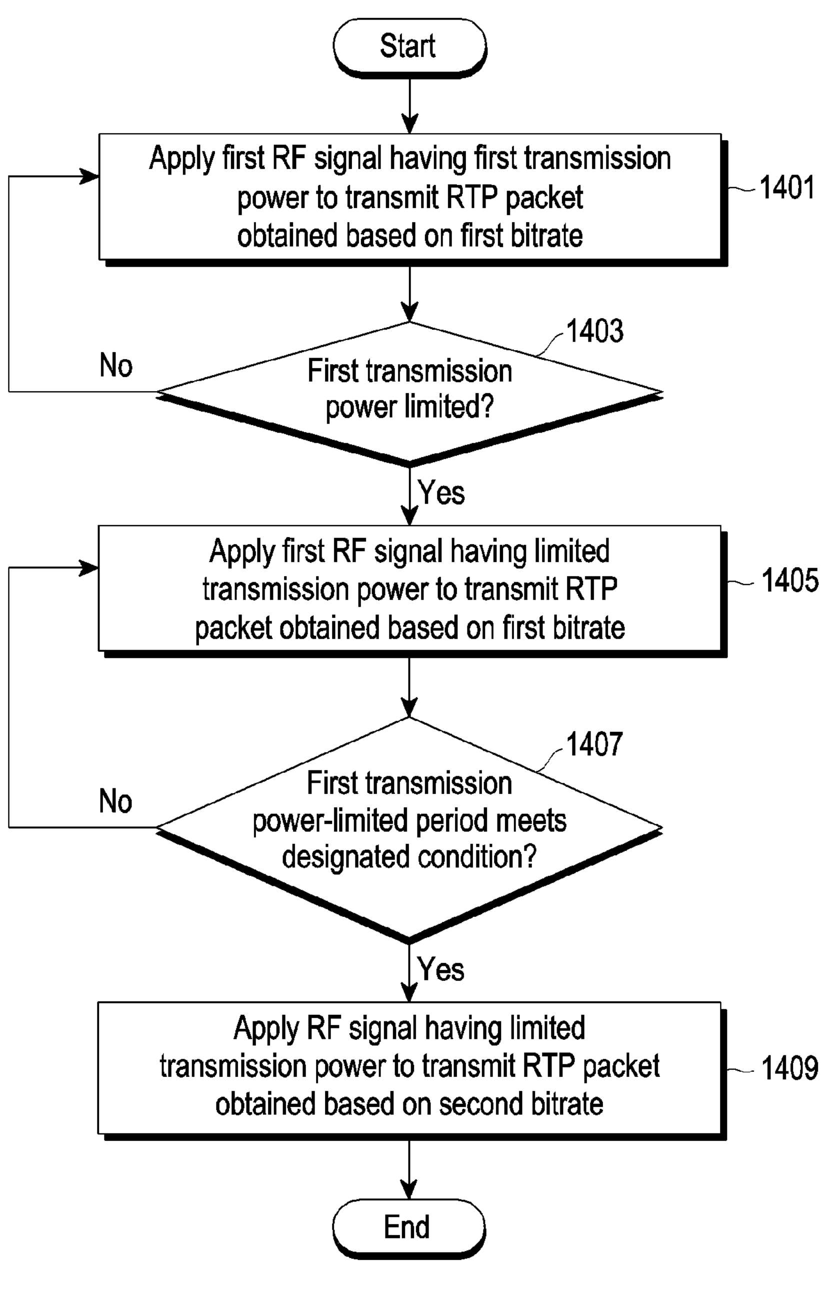
FIG. 14 is a flowchart illustrating an operation method of an electronic device according to an embodiment of the disclosure.

FIG. 14 is a flowchart illustrating an operation method of an electronic device according to an embodiment of the disclosure.

Referring to FIG. 14, the electronic device 101 (e.g., at least one of the processor 120, the first communication processor 212, the second communication processor 214, or the integrated communication processor 260) may apply a first RF signal having a first transmission power to transmit an RTP packet obtained based on a first bitrate in operation 1401. In operation 1403, the electronic device 101 may identify whether the first transmission power is limited. When the first transmission power is not limited (no in operation 1403), the electronic device 101 may transmit the RTP packet by applying the first RF signal having the first transmission power. Meanwhile, the first transmission power may change over time. If the first transmission power is limited (yes in operation 1403), the electronic device 101 may apply the first RF signal having the limited transmission power to transmit the RTP packet obtained based on the first bitrate in operation 1405. In contrast to the embodiment of FIG. 13, the electronic device 101 may not reduce the bitrate immediately when applying the RF signal of limited transmission power.

According to various embodiments, in operation 1507, the electronic device 101 may identify whether the period during which the first transmission power is limited meets a designated condition. For example, the designated condition is that the period during which the first transmission power is limited is longer than or equal to a designated threshold period, but is not limited thereto. If the designated condition is not met (no in operation 1407), the electronic device 101 may maintain application of the first RF signal having limited transmission power to transmit the RTP packet obtained based on the first bitrate. If the designated condition is met (yes in operation 1407), the electronic device 101 may apply the first RF signal having the limited transmission power to transmit the RTP packet obtained based on the second bitrate in operation 1409. Accordingly, it is possible to prevent degradation in call quality due to a decrease in bitrate caused by a temporary transmission signal limitation.

Figure 15:
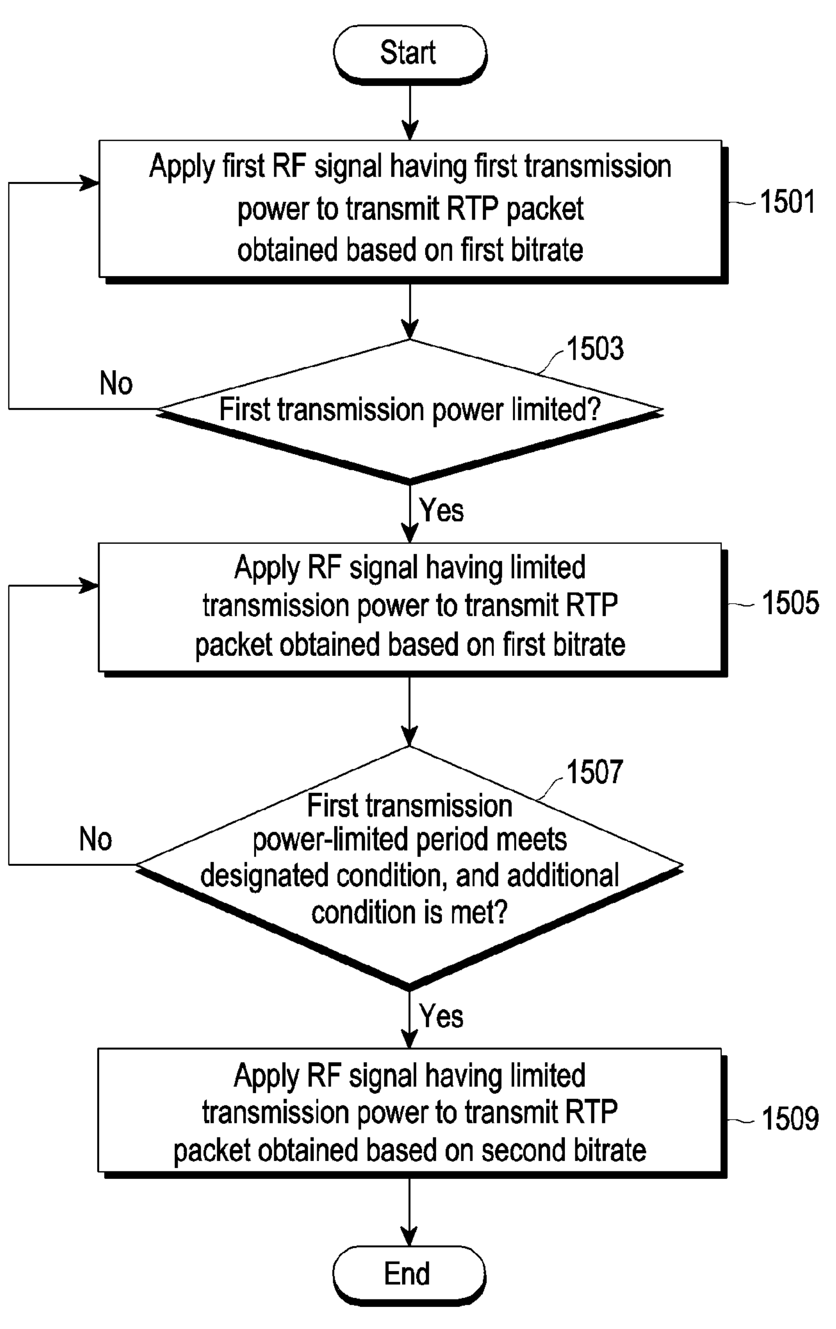
FIG. 15 is a flowchart illustrating an operation method of an electronic device according to an embodiment of the disclosure.

FIG. 15 is a flowchart illustrating an operation method of an electronic device according to an embodiment of the disclosure.

Referring to FIG. 15, the electronic device 101 (e.g., at least one of the processor 120, the first communication processor 212, the second communication processor 214, or the integrated communication processor 260) may apply a first RF signal having a first transmission power to transmit an RTP packet obtained based on a first bitrate in operation 1501. In operation 1503, the electronic device 101 may identify whether the first transmission power is limited. When the first transmission power is not limited (no in operation 1403), the electronic device 101 may transmit the RTP packet by applying the first RF signal having the first transmission power. Meanwhile, the first transmission power may change over time. If the first transmission power is limited (yes in operation 1403), the electronic device 101 may apply the first RF signal having the limited transmission power to transmit the RTP packet obtained based on the first bitrate in operation 1505. In contrast to the embodiment of FIG. 13, the electronic device 101 may not reduce the bitrate immediately when applying the RF signal of limited transmission power.

According to various embodiments, in operation 1507, the electronic device 101 may identify whether the period during which the first transmission power is limited meets a designated condition, and an additional condition is met. For example, the designated condition is that the period during which the first transmission power is limited is longer than or equal to a designated threshold period, but is not limited thereto. The additional condition may include, e.g., at least one condition associated with the communication environment of the electronic device 101. For example, the at least one condition is that the BLER during the first period is 40% or more. For example, the at least one condition is that a lost fraction during the second period is 10% or more. The above-described additional conditions are examples, and other various conditions that indicate that the communication environment is relatively degraded may apply without limitations. Or, an additional condition may be that two different states (e.g., a congestion state and a loaded state) are maintained for different periods of time. For example, if the congested state (e.g., a state with a BLER of 40% or greater and a lost fraction of 10% or greater) is maintained for one second, and the loaded state (e.g., a state with a BLER of 20% or greater and a lost fraction of 5% or greater) is maintained for five seconds, the electronic device 101 determines that the additional condition is met. If the designated condition and the additional condition are not met (no in operation 1507), the electronic device 101 may maintain application of the first RF signal having limited transmission power to transmit the RTP packet obtained based on the first bitrate. If the designated condition and the additional condition are met (yes in operation 1507), the electronic device 101 may apply the first RF signal having the limited transmission power to transmit the RTP packet obtained based on the second bitrate in operation 1509.

Figure 16:
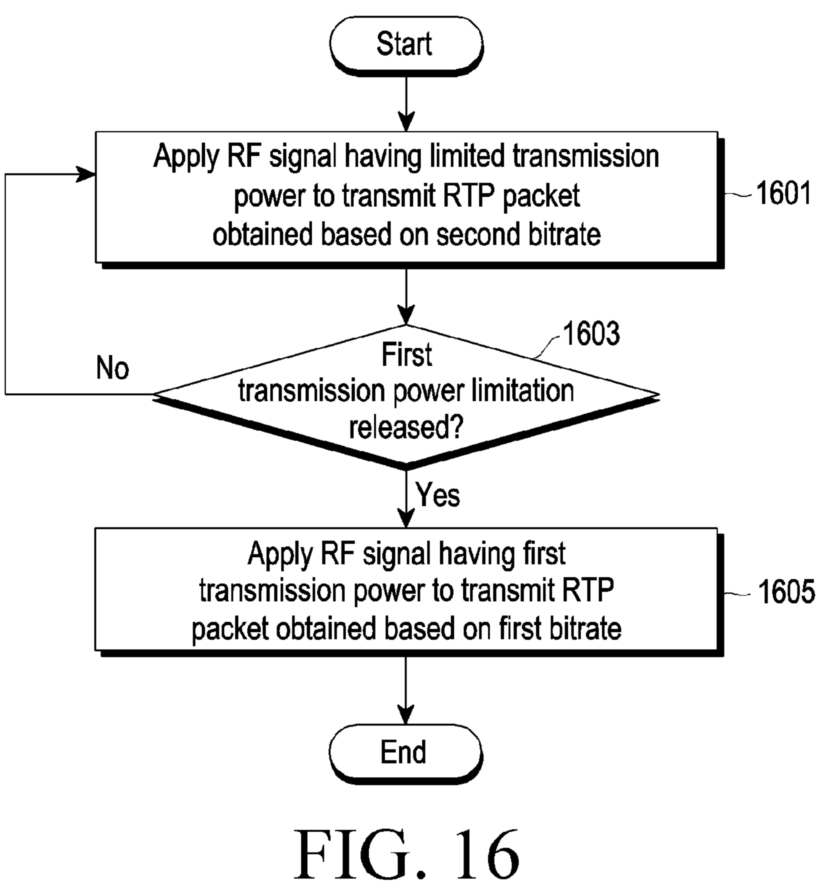
FIG. 16 is a flowchart illustrating an operation method of an electronic device according to an embodiment of the disclosure.

FIG. 16 is a flowchart illustrating an operation method of an electronic device according to an embodiment of the disclosure.

Referring to FIG. 16, the electronic device 101 (e.g., at least one of the processor 120, the first communication processor 212, the second communication processor 214, or the integrated communication processor 260) may apply an RF signal having a limited transmission power to transmit an RTP packet obtained based on a second bitrate in operation 1601. For example, it is assumed that the electronic device 101 generates an RTP packet at a relatively low second bitrate in a state in which transmission power determined by the electronic device 101 is limited. For example, according to various embodiments of FIG. 14, 15, or 16, the electronic device 101 reduces the bitrate from the first bitrate to the second bitrate.

According to various embodiments, in operation 1603, the electronic device 101 may identify whether the limitation of the first transmission power is released. For example, when detection of a transmission power limitation event fails or when the electronic device 101 leaves the weak electric field, the first transmission power limitation is released. When the limitation of the first transmission power is not released (no in operation 1603), the electronic device 101 may maintain the second bitrate. When the limitation of the first transmission power is released (yes in operation 1603), the electronic device 101 may apply the RF signal having the unrestricted first transmission power to transmit the RTP packet obtained based on the first bitrate in operation 1605. Based on the identification of transmission power limitation, the electronic device 101 may return the bitrate to the original first bitrate. Accordingly, call quality may be enhanced as the call termination probability decreases based on the end of transmission power limitation.

Figure 17:
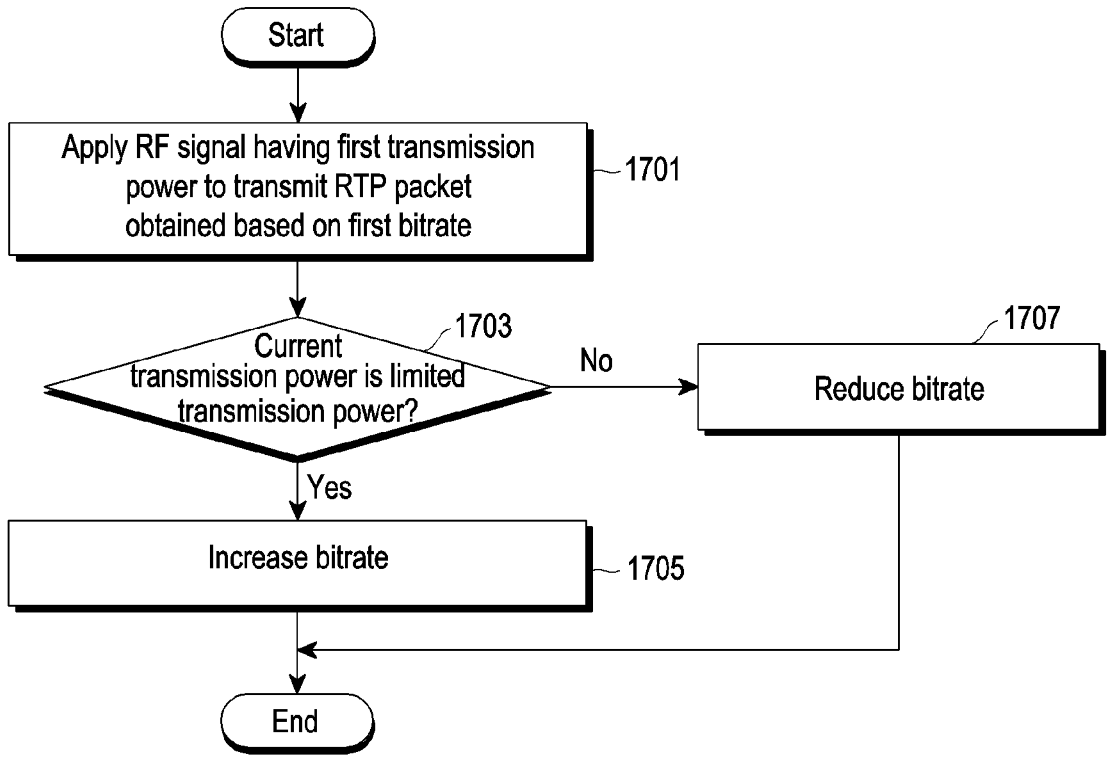
FIG. 17 is a flowchart illustrating an operation method of an electronic device according to an embodiment of the disclosure.

FIG. 17 is a flowchart illustrating an operation method of an electronic device according to an embodiment of the disclosure.

Referring to FIG. 17, the electronic device 101 (e.g., at least one of the processor 120, the first communication processor 212, the second communication processor 214, or the integrated communication processor 260) may apply a first RF signal having a first transmission power to transmit an RTP packet obtained based on a first bitrate in operation 1701. In operation 1703, the electronic device 101 may identify whether the current transmission power is limited transmission power. For example, the electronic device 101 identifies whether the determined transmission power is limited as the determined transmission power exceeds the maximum output power. According to various embodiments, when the current transmission power is the limited transmission power (yes in operation 1703), the electronic device 101 may increase the bitrate in operation 1705. When the current transmission power is not the limited transmission power (no in operation 1703), the electronic device 101 may reduce the bitrate in operation 1707.

Although not shown, the electronic device 101 may reduce the bitrate when the current transmission power is the limited transmission power and the additional condition for reducing the bitrate is met. For example, the additional condition for reducing the bitrate is a congestion state for one second and a loaded state for five seconds, but there is no limitation. For example, when the current transmission power is limited and the additional condition for reducing the bitrate is not met, the electronic device 101 maintains the current bitrate. The electronic device 101 may increase the bitrate when the additional condition for increasing the bitrate is met while the current transmission power is not limited. Additional conditions for increasing the bitrate may be not being in an unloaded state for five seconds (e.g., a state where the BLER is less than 20% and the lost fraction is 0%), and not being in the congested state for ten seconds, but are not limited. For example, when the current transmission power is not limited and the additional condition for increasing the bitrate is not met, the electronic device 101 maintains the current bitrate. According to various embodiments, after adjusting the bitrate once, the electronic device 101 may identify whether to increase, decrease, or maintain the bitrate.

According to various embodiments, an electronic device may comprise at least one processor and at least one RF device. The at least one processor may be configured to identify a plurality of transmission power respectively corresponding to a plurality of messages, identify a maximum output power of the electronic device based on a state of the electronic device, in case that at least one first transmission power corresponding to at least one first message among the plurality of messages is smaller than the maximum output power, control the at least one RF device to provide a first RF signal having the maximum output power, to transmit the at least one first message, and in case that at least one second transmission power corresponding to at least one second message among the plurality of messages is smaller than the maximum output power, control the at least one RF device to provide a second RF signal having a power larger than the maximum output power, to transmit the at least one second message.

According to various embodiments, the at least one processor may be configured to, as at least part of identifying the maximum output power of the electronic device based on the state of the electronic device, identify a minimum value of a UE maximum output power set for the electronic device and at least one output power respectively corresponding to at least one event identified based on the state of the electronic device, as the maximum output power.

According to various embodiments, the at least one processor may be configured to, as at least part of controlling, in case that the at least one second transmission power is smaller than the maximum output power, the at least one RF device to provide the second RF signal having the power larger than the maximum output power, to transmit the at least one second message, control, in case that at least part of the at least one event are identified, the at least one RF device to provide the second RF signal having a smaller power among the UE maximum output power and the at least one second transmission power.

According to various embodiments, the at least one processor may be configured to, as at least part of controlling, in case that the at least one first transmission power is smaller than the maximum output power, the at least one RF device to provide the first RF signal having the maximum output power, to transmit the at least one first message, control, in case that at least part of the at least one event are identified, the at least one RF device to provide the second RF signal having a smaller power among the UE maximum output power and output power corresponding to the at least some of the at least one event and the at least one first transmission power.

According to various embodiments, the at least one processor may be further configured to identify an occurrence of a first event among the at least one event. The at least one processor may be configured to, as at least part of controlling, in case that the at least one first transmission power is smaller than the maximum output power, the at least one RF device to provide the first RF signal having the maximum output power, to transmit the at least one first message, control the at least one RF device to provide the first RF signal having a smaller power among the UE maximum output power and a first sub output power corresponding to the at least one first message and the first event. The at least one processor may be configured to, as at least part of controlling, in case that the at least one second transmission power is smaller than the maximum output power, the at least one RF device to provide the second RF signal having the power larger than the maximum output power, to transmit the at least one second message, control the at least one RF device to provide the second RF signal having a smaller power among the UE maximum output power and a second sub output power corresponding to the at least one second message and the first event. The second sub output power may be larger than the first sub output power.

According to various embodiments, the at least one processor may be configured to, as at least part of controlling, in case that the at least one second transmission power is smaller than the maximum output power, the at least one RF device to provide the second RF signal having the power larger than the maximum output power, to transmit the at least one second message, determine a transmission power of the second RF signal such that an accumulated SAR value predicted for a designated period satisfies a designated value or less, and control the at least one RF device to provide the second RF signal having the determined transmission power.

According to various embodiments, the at least one processor may be configured to identify a trigger for transmitting an RACH preamble included in the at least one second message. The at least one processor may be configured to, as at least part of controlling, in case that the at least one second transmission power is smaller than the maximum output power, the at least one RF device to provide the second RF signal having the power larger than the maximum output power, to transmit the at least one second message, identify a transmission power of a PRACH for transmitting the RACH preamble as the at least one second transmission power based on identifying the trigger, and control, in case that the transmission power of the PRACH is smaller than the maximum output, the at least one RF device to provide the second RF signal having the power larger than the maximum output power, to transmit the RACH preamble.

According to various embodiments, the at least one processor may be configured to identify a trigger for transmitting a SRB-based message included in the at least one second message. The at least one processor may be configured to, as at least part of controlling, in case that the at least one second transmission power is smaller than the maximum output power, the at least one RF device to provide the second RF signal having the power larger than the maximum output power, to transmit the at least one second message, identify a transmission power for transmitting the SRB-based message as the at least one second transmission power based on identifying the trigger, and control, in case that the transmission power for transmitting the SRB-based message is smaller than the maximum output, the at least one RF device to provide the second RF signal having the power larger than the maximum output power, to transmit the SRB-based message.

According to various embodiments, an electronic device may comprise at least one processor and at least one RF device. The at least one processor may be configured to identify a first transmission power for transmitting a first RTP packet, identify a first maximum output power of the electronic device based on a state of the electronic device, control the at least one RF device to provide a first RF signal having the first transmission power, to transmit the first RTP packet obtained based on a first bitrate based on the identified first transmission power and the first maximum output power of the electronic device failing to meet a designated condition, identify a second transmission power for transmitting a second RTP packet, identify a second maximum output power of the electronic device based on the state of the electronic device, and control the at least one RF device to provide a second RF signal having the maximum output power, to transmit the second RTP packet obtained based on a second bitrate lower than the first bitrate based on the identified second transmission power and the second maximum output power of the electronic device meeting the designated condition.

According to various embodiments, the at least one processor may be further configured to identify that the designated condition is not met based on the identified first transmission power being the first maximum output power or less. The at least one processor may be further configured to identify that the designated condition is met based on the identified second transmission power exceeding the second maximum output power.

According to various embodiments, the at least one processor may be configured to, as at least part of identifying that that the designated condition is met based on the identified second transmission power exceeding the second maximum output power, identify a period in case that the identified second transmission power exceeds the second maximum output power and identify that the designated condition is met based on the identified period being a designated threshold period or more.

According to various embodiments, the at least one processor may be configured to, as at least part of identifying that the designated condition is met based on the identified second transmission power exceeding the second maximum output power, identify that the identified second transmission power exceeds the second maximum output power and identify that the designated condition is met based on at least one additional condition associated with a communication environment of the electronic device being met.

According to various embodiments, the at least one processor may be further configured to identify a third transmission power for transmitting a third RTP packet after controlling the at least one RF device to provide the second RF signal having the maximum output power, to transmit the second RTP packet obtained based on the second bitrate, identify a third maximum output power of the electronic device based on the state of the electronic device, and control the at least one RF device to provide a third RF signal having the third transmission power, to transmit the third RTP packet obtained based on the first bitrate based on the identified third transmission power and the third maximum output power of the electronic device failing to meet the designated condition.

According to various embodiments, the at least one processor may be further configured to identify a fourth transmission power for transmitting a fourth RTP packet after controlling the at least one RF device to provide the second RF signal having the maximum output power, to transmit the second RTP packet obtained based on the second bitrate, identify a fourth maximum output power of the electronic device based on the state of the electronic device, and control the at least one RF device to provide a fourth RF signal having the fourth transmission power, to transmit the fourth RTP packet obtained based on a third bitrate smaller than the second bitrate based on the identified fourth transmission power and the fourth maximum output power of the electronic device meeting the designated condition.

According to various embodiments, the at least one processor may be configured to, as at least part of identifying the first maximum output power of the electronic device based on the state of the electronic device, set a UE maximum output power set for the electronic device as the first maximum output power, and the at least one processor may be configured to, as part of identifying the second maximum output power of the electronic device based on the state of the electronic device, identify a minimum value among at least one output power respectively corresponding to at least one event identified based on the state of the electronic device and the UE maximum output power as the second maximum output power.

According to various embodiments, a method for operating an electronic device including at least one RF device may comprise identifying a plurality of transmission power respectively corresponding to a plurality of messages, identifying a maximum output power of the electronic device based on a state of the electronic device, controlling, in case that at least one first transmission power corresponding to at least one first message among the plurality of messages is smaller than the maximum output power, the at least one RF device to provide a first RF signal having the maximum output power, to transmit the at least one first message, and controlling, in case that at least one second transmission power corresponding to at least one second message among the plurality of messages is smaller than the maximum output power, the at least one RF device to provide a second RF signal having a power larger than the maximum output power, to transmit the at least one second message.

According to various embodiments, identifying the maximum output power of the electronic device based on the state of the electronic device may include identifying a minimum value among a UE maximum output power set for the electronic device and at least one output power respectively corresponding to at least one event identified based on the state of the electronic device, as the maximum output power.

According to various embodiments, controlling, in case that the at least one second transmission power is smaller than the maximum output power, the at least one RF device to provide the second RF signal having the power larger than the maximum output power, to transmit the at least one second message may include, controlling, in case that at least part of the at least one event are identified, the at least one RF device to provide the second RF signal having a smaller power among the UE maximum output power and the at least one second transmission power.

According to various embodiments, controlling, in case that the at least one first transmission power is smaller than the maximum output power, the at least one RF device to provide the first RF signal having the maximum output power, to transmit the at least one first message may include, controlling, in case that at least part of the at least one event are identified, the at least one RF device to provide the second RF signal having a smaller power among the UE maximum output power and output power corresponding to the at least part of the at least one event and the at least one first transmission power.

According to various embodiments, the method may further comprise identifying an occurrence of a first event among the at least one event. Controlling, in case that the at least one first transmission power is smaller than the maximum output power, the at least one RF device to provide the first RF signal having the maximum output power, to transmit the at least one first message may include, controlling the at least one RF device to provide the first RF signal having a smaller power among the UE maximum output power and a first sub output power corresponding to the at least one first message and the first event, and controlling, in case that the at least one second transmission power is smaller than the maximum output power, the at least one RF device to provide the second RF signal having the power larger than the maximum output power, to transmit the at least one second message may include, controlling the at least one RF device to provide the second RF signal having a smaller power among the UE maximum output power and a second sub output power corresponding to the at least one second message and the first event. The second sub output power may be larger than the first sub output power.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:

at least one radio frequency (RF) device, memory storing instructions; and at least one processor communicatively coupled to the at least one RF device and the memory, wherein the instructions, when executed by the at least one processor individually or collectively, cause the electronic device to:

identify an allowable output power of the electronic device that is reduced from a maximum output power of the electronic device according to an occurrence of a specific absorption rate (SAR) event, identify message types to be transmitted among a first type of messages type and a second types of messages, control, in case that a first transmission power determined for transmitting the first type of messages is larger than the allowable output power, the at least one RF device to provide a first RF signal having the allowable output power to transmit at least one message of the first type while the SAR event is occurring, and control, in case that a second transmission power determined for transmitting the second type of messages is larger than the allowable output power, the at least one RF device to provide a second RF signal having a power larger than the allowable output power, to transmit at least one message of the second type while the SAR event is occurring.

2. The electronic device of claim 1, wherein the instructions, when executed by the at least one processor individually or collectively, further cause the electronic device to, as at least part of identifying the allowable output power of the electronic device based on a state of the electronic device, identify a minimum value among a user equipment (UE) maximum output power set for the electronic device and at least one output power respectively corresponding to at least one event identified based on the state of the electronic device, as the allowable output power.

3. The electronic device of claim 2, wherein the instructions, when executed by the at least one processor individually or collectively, further cause the electronic device to, as at least part of controlling, in case that the second transmission power is larger than the allowable output power, the at least one RF device to provide the second RF signal having the power larger than the allowable output power, to transmit the at least one message of the second type, control, in case that at least part of the at least one event are identified, the at least one RF device to provide the second RF signal having a smaller power among the UE maximum output power and the second transmission power.

4. The electronic device of claim 2, wherein the instructions, when executed by the at least one processor individually or collectively, further cause the electronic device to, as at least part of controlling, in case that the first transmission power is larger than the allowable output power, the at least one RF device to provide the first RF signal having the allowable output power, to transmit the at least one message of the first type, control, in case that at least part of the at least one event are identified, the at least one RF device to provide the second RF signal having a smaller power among the UE maximum output power and output power corresponding to the at least part of the at least one event and the first transmission power.

5. The electronic device of claim 1, wherein the instructions, when executed by the at least one processor individually or collectively, further cause the electronic device to, as at least part of controlling, in case that the second transmission power is larger than the allowable output power, the at least one RF device to provide the second RF signal having the power larger than the allowable output power, to transmit the at least one message of the second type, determine a transmission power of the second RF signal such that an accumulated specific absorption rate (SAR) value predicted for a designated period satisfies a designated value or less, and control the at least one RF device to provide the second RF signal having the determined transmission power.

6. The electronic device of claim 1, wherein the instructions, when executed by the at least one processor individually or collectively, further cause the electronic device to identify a trigger for transmitting a random access channel (RACH) preamble included in the at least one message of the second type, and wherein the instructions, when executed by the at least one processor individually or collectively, further cause the electronic device to, as at least part of controlling, in case that the second transmission power is smaller than the allowable output power, the at least one RF device to provide the second RF signal having the power larger than the allowable output power, to transmit the at least one message of the second type:

identify a transmission power of a physical RACH (PRACH) for transmitting the RACH preamble as the second transmission power based on identifying the trigger, and control, in case that the transmission power of the PRACH is smaller than the allowable output power, the at least one RF device to provide the second RF signal having the power larger than the allowable output power, to transmit the RACH preamble.

7. The electronic device of claim 1, wherein the instructions, when executed by the at least one processor individually or collectively, further cause the electronic device to identify a trigger for transmitting a signaling radio bearer (SRB)-based message included in the at least one message of the second type, and wherein the instructions, when executed by the at least one processor individually or collectively, further cause the electronic device to, as at least part of controlling, in case that the second transmission power is larger than the allowable output power, the at least one RF device to provide the second RF signal having the power larger than the allowable output power, to transmit the at least one message of the second type:

identify a transmission power for transmitting the SRB-based message as the second transmission power based on identifying the trigger, and control, in case that the transmission power for transmitting the SRB-based message is smaller than the allowable output power, the at least one RF device to provide the second RF signal having the power larger than the allowable output power, to transmit the SRB-based message.

8. A method for operating an electronic device including at least one radio frequency (RF) device, the method comprising:

identifying an allowable output power of the electronic device that is reduced from a maximum output power of the electronic device according to an occurrence of a specific absorption rate (SAR) event;

identifying message types to be transmitted among a first type of messages type and a second types of messages;

controlling, in case that a first transmission power the first type of messages is larger than the allowable output power, the at least one RF device to provide a first RF signal having the allowable output power, to transmit at least one message of the first type while the SAR event is occurring; and controlling, in case that a second transmission power determined for transmitting the second type of messages is larger than the allowable output power, the at least one RF device to provide a second RF signal having a power larger than the allowable output power, to transmit at least one message of the second type while the SAR event is occurring.

9. The method of claim 8, wherein the identifying of the allowable output power of the electronic device based on a state of the electronic device comprises:

identifying a minimum value among a user equipment (UE) maximum output power set for the electronic device and at least one output power respectively corresponding to at least one event identified based on the state of the electronic device, as the allowable output power.

10. The method of claim 9, wherein the controlling, in case that the second transmission power is larger than the allowable output power, the at least one RF device to provide the second RF signal having the power larger than the allowable output power, to transmit the at least one message of the second type comprises:

controlling the at least one RF device to provide the second RF signal having a smaller power among the UE maximum output power and the second transmission power in case that at least part of the at least one event are identified.

11. The method of claim 9, wherein the controlling, in case that the first transmission power is larger than the allowable output power, the at least one RF device to provide the first RF signal having the allowable output power, to transmit the at least one message of the first type comprises:

controlling the at least one RF device to provide the second RF signal having a smaller power among the UE maximum output power and output power corresponding to at least part of the at least one event and the first transmission power, in case that at least part of the at least one event are identified.

12. The method of claim 8, wherein the controlling, in case that the second transmission power is larger than the maximum output power, the at least one RF device to provide the second RF signal having the power larger than the allowable output power, to transmit the at least one message of the second type comprises:

determining a transmission power of the second RF signal such that an accumulated SAR value predicted for a designated period satisfies a designated value or less, and controlling the at least one RF device to provide the second RF signal having the determined transmission power.

13. The method of claim 8, wherein the method further comprises identifying a trigger for transmitting an random access channel (RACH) preamble included in the at least one message of the second type, and wherein the controlling, in case that the second transmission power is larger than the allowable output power, the at least one RF device to provide the second RF signal having the power larger than the allowable output power, to transmit the at least one message of the second type comprises:

identifying a transmission power of a physical RACH (PRACH) for transmitting the RACH preamble as the second transmission power based on identifying the trigger, and controlling, in case that the transmission power of the PRACH is smaller than the allowable output power, the at least one RF device to provide the second RF signal having the power larger than the allowable output power, to transmit the RACH preamble.

14. The method of claim 8, wherein the method further comprises identifying a trigger for transmitting a signaling radio bearer (SRB)-based message included in the at least one message of the second type, and wherein the controlling, in case that the second transmission power is larger than the allowable output power, the at least one RF device to provide the second RF signal having the power larger than the allowable output power, to transmit the at least one message of the second type comprises:

identifying a transmission power for transmitting the SRB-based message as the second transmission power based on identifying the trigger, and controlling, in case that the transmission power for transmitting the SRB-based message is smaller than the allowable output power, the at least one RF device to provide the second RF signal having the power larger than the allowable output power, to transmit the SRB-based message.

15. A non-transitory computer-readable storage media recorded with computer-executable instructions that, when executable by executed by one or more processors of an electronic device individually or collectively, the electronic device including at least one radio frequency (RF) device, cause the electronic device to perform operations, the operations comprising:

identifying an allowable output power of the electronic device that is reduced from a maximum output power of the electronic device according to an occurrence of a specific absorption rate (SAR) event;

identifying message types to be transmitted among a first type of messages type and a second types of messages;

controlling, in case that a first transmission power determined for transmitting the first type of messages is larger than the allowable output power, the at least one RF device to provide a first RF signal having the allowable output power, to transmit at least one message of the first type while the SAR event is occurring; and controlling, in case that a second transmission power the second type of messages is than the allowable output power, the at least one RF device to provide a second RF signal having a power larger than the allowable output power, to transmit at least one message of the second type while the SAR event is occurring.

16. The non-transitory computer-readable storage media of claim 15, wherein the identifying of the allowable output power of the electronic device based on a state of the electronic device comprises:

identifying a minimum value among a user equipment (UE) maximum output power set for the electronic device and at least one output power respectively corresponding to at least one event identified based on the state of the electronic device, as the allowable output power.

17. The non-transitory computer-readable storage media of claim 16, wherein the controlling, in case that the second transmission power is larger than the allowable output power, the at least one RF device to provide the second RF signal having the power larger than the allowable output power, to transmit the at least one message of the second type comprises:

controlling the at least one RF device to provide the second RF signal having a smaller power among the UE maximum output power and the second transmission power in case that at least part of the at least one event are identified.

18. The non-transitory computer-readable storage media of claim 16, wherein the controlling, in case that the first transmission power is larger than the allowable output power, the at least one RF device to provide the first RF signal having the allowable output power, to transmit the at least one message of the first type comprises:

controlling the at least one RF device to provide the second RF signal having a smaller power among the UE maximum output power and output power corresponding to at least part of the at least one event and the first transmission power, in case that at least part of the at least one event are identified.

* * * * *